(12) United States Patent
Tsuda et al.

(10) Patent No.: US 6,629,090 B2
(45) Date of Patent: Sep. 30, 2003

(54) METHOD AND DEVICE FOR ANALYZING DATA

(75) Inventors: Hidetaka Tsuda, Kawasaki (JP); Hidehiro Shirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 09/769,528

(22) Filed: Jan. 26, 2001

(65) Prior Publication Data

US 2001/0020284 A1 Sep. 6, 2001

(30) Foreign Application Priority Data

Feb. 18, 2000 (JP) ........................................ 2000-041896
Sep. 20, 2000 (JP) ........................................ 2000-284578

(51) Int. Cl.[7] ............................................. G06F 17/00
(52) U.S. Cl. ....................................................... 706/47
(58) Field of Search ........................................... 706/47

(56) References Cited

PUBLICATIONS

E. Kapetanios, "Extracting and Providing Knowledge Within an Object–Centered Scientific Information System for Atmospheric Research", IEEE Proceedings of the Eighth International Conference on Scientific and Statistical Database, Jun. 1996.*

Hidetaka, Tsyda, et al., LSI Manufacturing Data Analysis By Data Mining, Jun. 1999, pp. 24–32.

Hidetaka, Tsuda et al., Yield Analysis and Improvement by Reducing Manufacturing Fluctuation Noise, Sep. 26, 2000.

* cited by examiner

Primary Examiner—George B. Davis
(74) Attorney, Agent, or Firm—Staas & Halsey LLP

(57) ABSTRACT

A rule present between a plurality of data values is extracted through data mining to output the rule and the information showing the reliability of the rule. A set-division evaluation-value S-ratio and a t-value showing the clearness of division when dividing a set constituted of a plurality of data values into two subsets are defined as the information showing the reliability of a rule.

$$S\text{-ratio} = ((S1+S2)/2)/S0$$

wherein, S0 is sum of squares of purpose variables of set before divided, S1, S2 are sums of squares of purpose variables of each subset after divided.

21 Claims, 29 Drawing Sheets

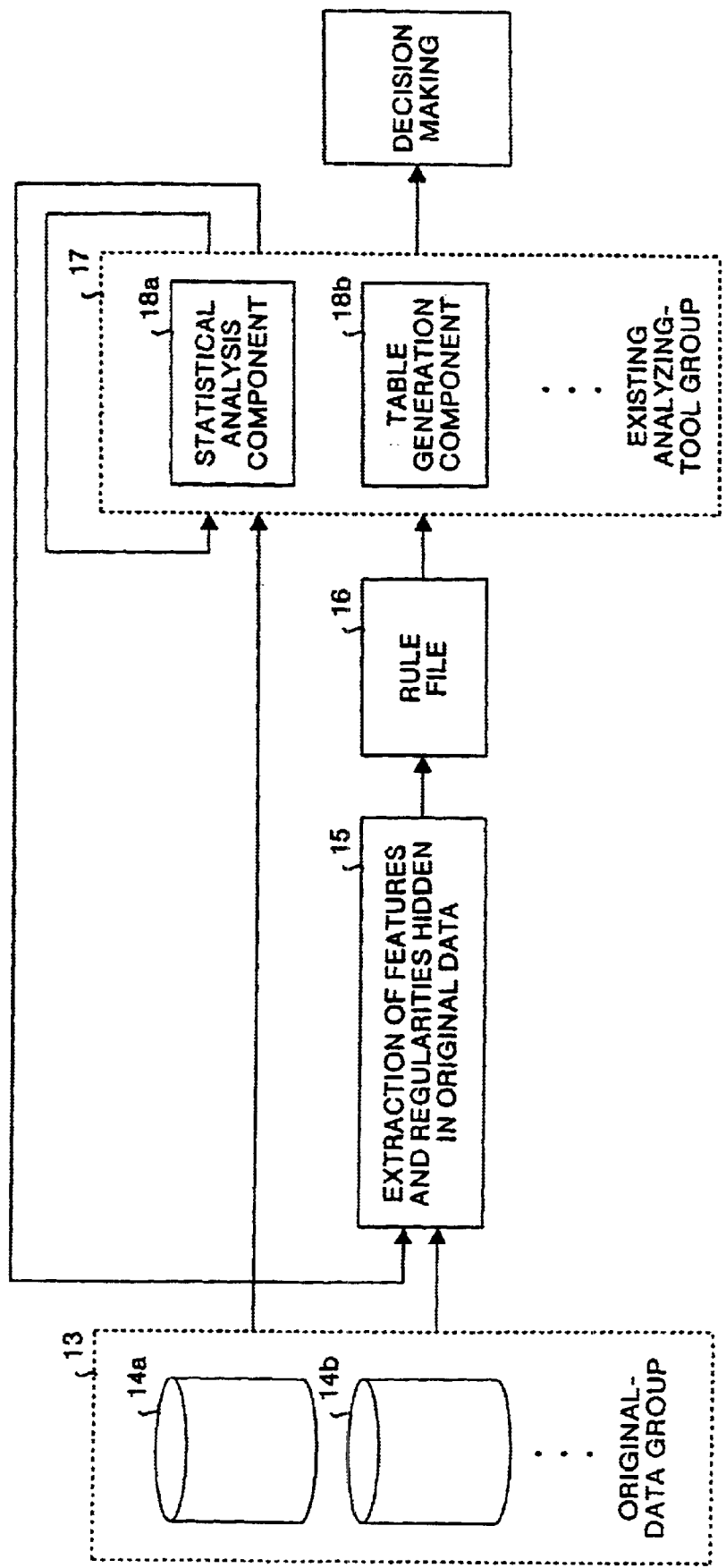

FIG.9

| LOT NUMBER | PROCESS 1 | PROCESS 2 | ... | PROCESS 1 | YIELD |
|---|---|---|---|---|---|
| LOT 1 | DEVICE z2 | DEVICE a3 | ... | DEVICE v3 | 0.805 |
| LOT 2 | DEVICE z3 | DEVICE a5 | ... | DEVICE v1 | 0.715 |
| | DEVICE z3 | DEVICE b6 | ... | DEVICE v1 | 0.825 |
| LOT j | DEVICE z2 | DEVICE a3 | ... | DEVICE v3 | 0.605 |

FIG.16

| PROCESS NAME | | | AVERAGE YIELD | NUMBER OF LOTS |
|---|---|---|---|---|
| STA | STB | STC | | |
| MECA02/03 | MECB02 | don't care | 40% | 5 |
| MECA02/03 | MECB03 | don't care | 75% | 25 |
| MECA01 | don't care | MECC02/03 | 80% | 15 |
| MECA01 | don't care | MECC01 | 90% | 20 |

FIG.20

Title : MB04

```
                              No.0 [60.09259]
                                   n=27
           ┌───────────────────────┴───────────────────────┐
      No.1 [65.27826]                                 No.14 [30.275]
      n=23、ST22=ST22                                  n=4、
      M3/ST22M2/nop                                   ST22=ST22M1
   ┌───────┴───────┐                              ┌───────┴───────┐
 No.2 [52.21429]  No.9 [70.99375]           No.15 [17.6]      No.16 [42.95]
 n=7、ST21=ST21M4  n=16、ST21=                  n=2、              n=2、
                  ST3M3/nop                   ST54=ST54M2       ST54=ST54M1
   ┌───┴───┐       ┌───┴───┐
 No.3    No.6   No.10      No.13 [88.64]
 [69.3]  [29.43333] [74.91666]  n=10、ST20=
 n=4、   n=3、   n=6、          ST20M1/nop
 ST25=   ST25=  ST20=ST20M2
 ST25M2  ST25M1              ┌───┴───┐
   ┌─┴─┐   ┌─┴─┐          No.11      No.12 [77.84]
 No.4 No.5 No.7 No.8       [60.3]     n=5、
 [62.45][76.15][29.7][29.3] n=1、ST30= ST30=ST30M2
 n=2、 n=2、 n=1、 n=2、    ST30M3/ST30M4
 ST12= ST12= ST3=  ST3=
 ST12M1 ST12M2 ST3M2 ST3M3
```

[EVALUATING STATISTICAL VALUES OF HIGH-ORDER 10 ITEMS AT FIRST BISECTION]
WHOLE ave=60.09259, s=21.11511, N=27
01 : S-RATIO= 0.3266, t= 3.643, (DIFFERENCE 35.00326, N23:4 ) attr=ST22, group= {ST22M3/ST22M2/nop>ST22M1}
02 : S-RATIO= 0.3380, t= 3.641, (DIFFERENCE 45.892 , N25:2 ) attr=ST13, group= {ST13M2/ST13M1/ST13M3>nop}
03 : S-RATIO= 0.3380, t= 3.641, (DIFFERENCE 45.892 , N25:2 ) attr=ST14, group= {ST14M1>nop}
04 : S-RATIO= 0.3380, t= 3.641, (DIFFERENCE 45.892 , N25:2 ) attr=ST15, group= {ST15M2>nop}
05 : S-RATIO= 0.3380, t= 3.641, (DIFFERENCE 45.892 , N25:2 ) attr=ST16, group= {ST16M3/ST16M2>nop}
06 : S-RATIO= 0.3380, t= 3.641, (DIFFERENCE 45.892 , N25:2 ) attr=ST52, group= {ST52M1>nop}
07 : S-RATIO= 0.3380, t= 3.641, (DIFFERENCE 45.892 , N25:2 ) attr=ST53, group= {ST53M1>nop}
08 : S-RATIO= 0.3380, t= 3.641, (DIFFERENCE 45.892 , N25:2 ) attr=ST47, group= {ST47M2>ST47M1>ST47M3}
09 : S-RATIO= 0.3882, t= 2.683, (DIFFERENCE 24.01191, N21:6 ) attr=ST31, group= {ST31M2>ST31M1}
10 : S-RATIO= 0.3889, t= 2.672, (DIFFERENCE 20.02666, N12:15) attr=ST46, group= {ST46M2<ST46M3/ST46M1}

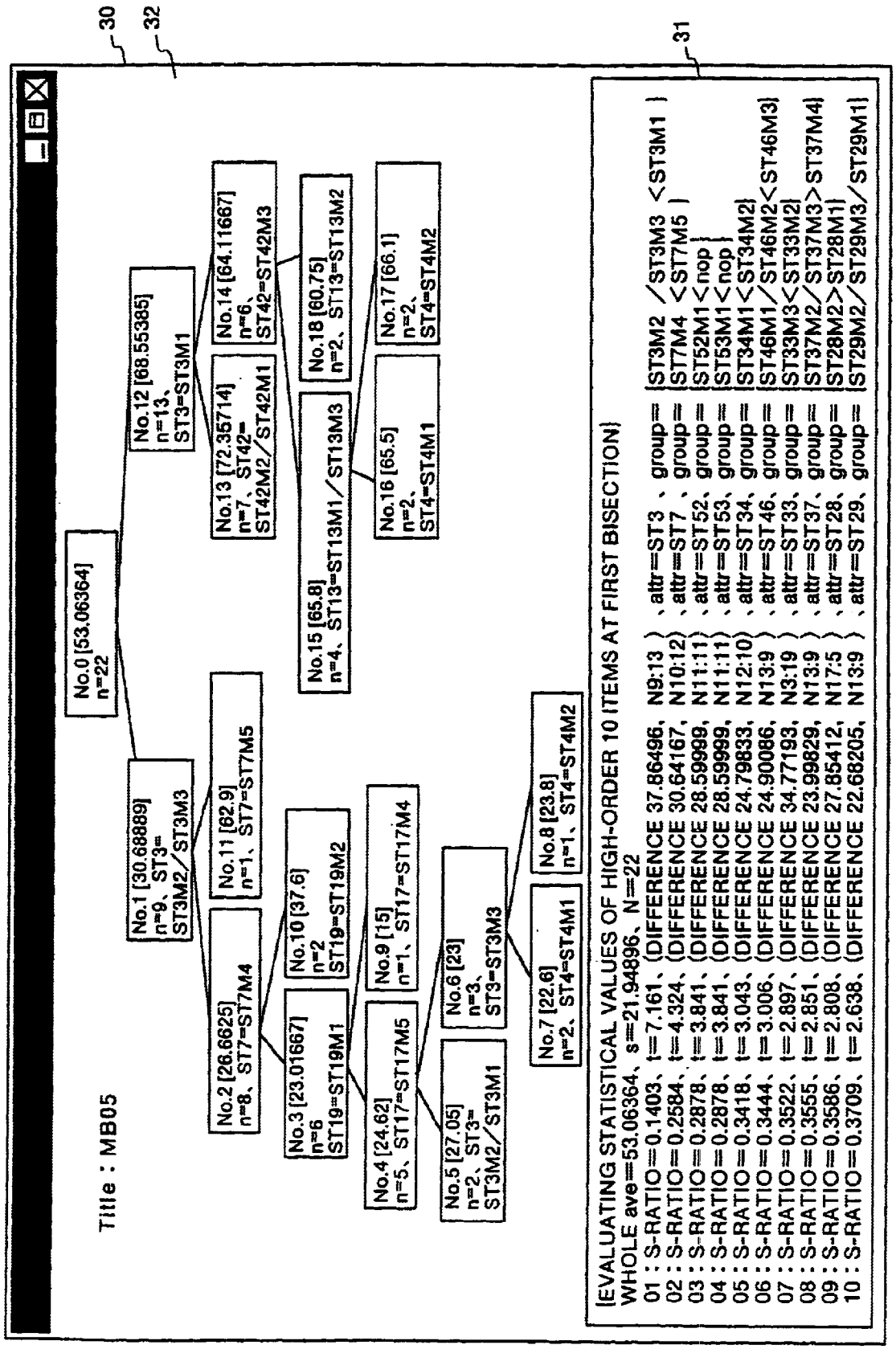

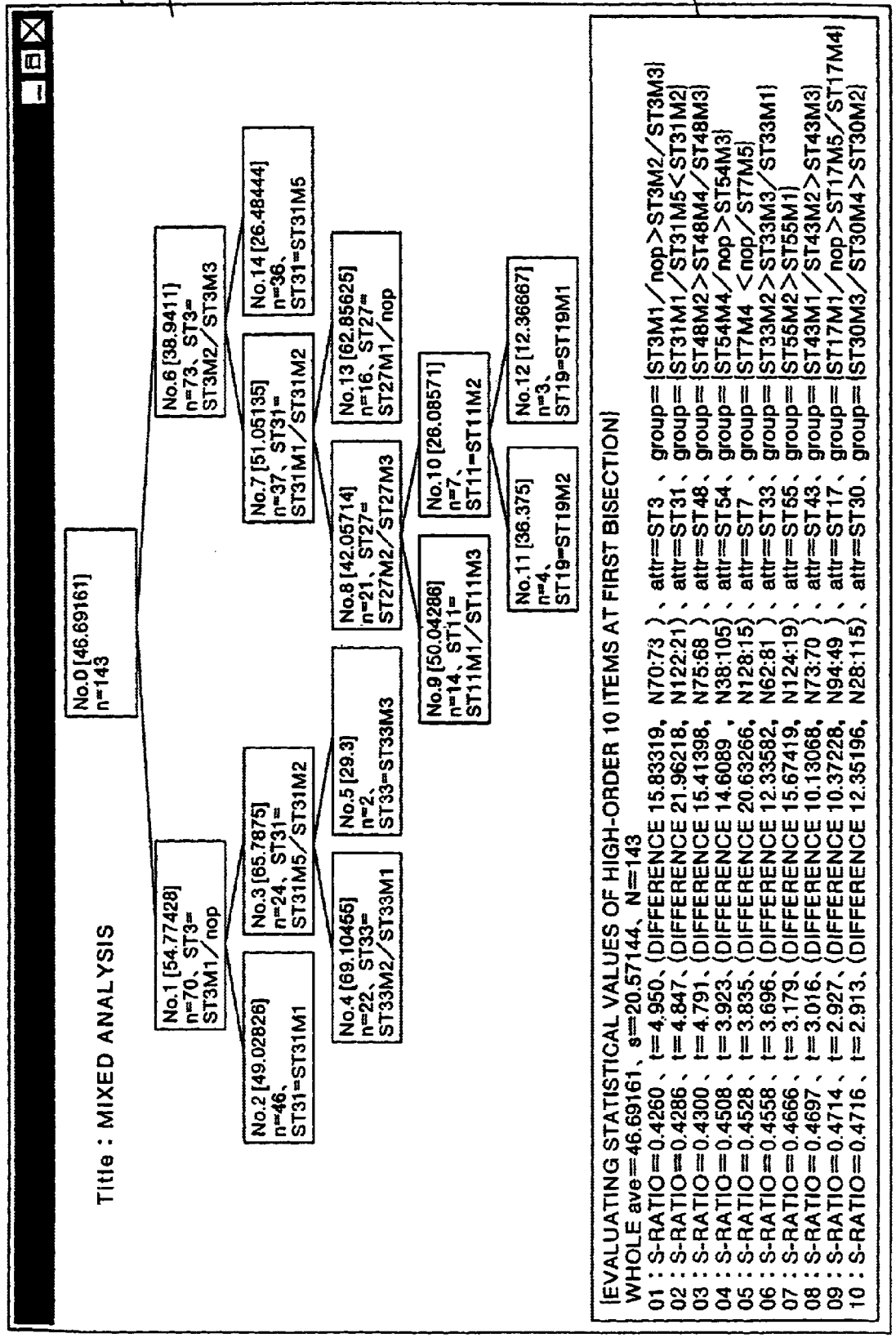

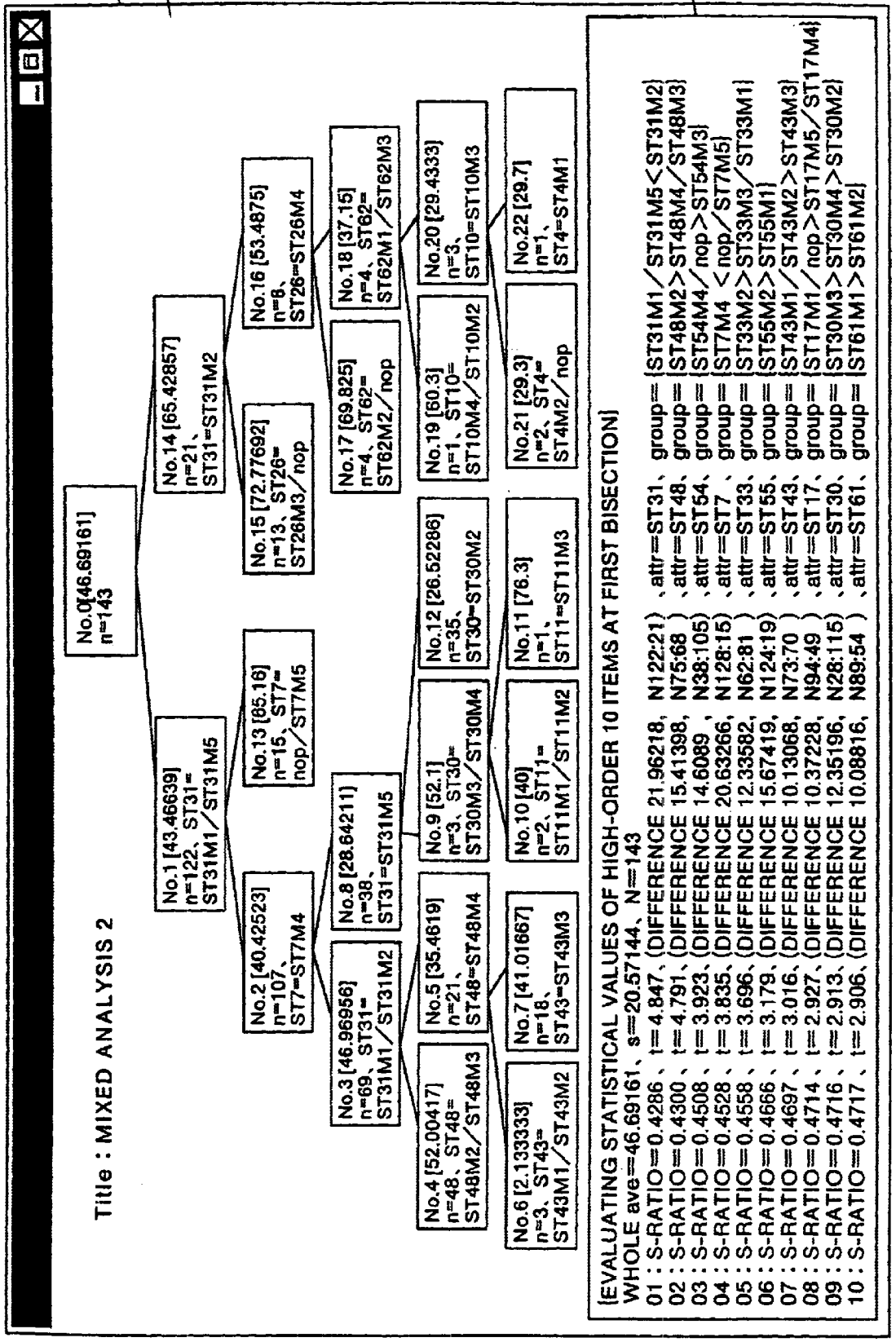

FIG.24

| WAFER NUMBER | PROCESS A | PROCESS B | ... | RSP | WET_I | YIELD |
|---|---|---|---|---|---|---|
| WAFER 1 | DEVICE AM2 | DEVICE BM1 | | EVALUATION VALUE I1 | EVALUATION VALUE I1 | 0.805 |
| WAFER 2 | DEVICE AM1 | DEVICE BM1 | | EVALUATION VALUE I2 | EVALUATION VALUE I2 | 0.715 |
| | DEVICE AM1 | DEVICE BM2 | | EVALUATION VALUE I3 | EVALUATION VALUE I3 | 0.825 |
| WAFER I | DEVICE AM2 | DEVICE BM1 | | EVALUATION VALUE I4 | EVALUATION VALUE I4 | 0.605 |

FIG.26

| PROCESS AND ELECTRICAL-CHARACTERISTIC DATA FOR WAFER | | | | AVERAGE YIELD | NUMBER OF WAFERS |
|---|---|---|---|---|---|
| PROCESS A | PROCESS B | PROCESS C | RSP | | |
| AM1 | BM1 | don't care | don't care | 45% | 80 |
| | BM3 | | | 60% | 120 |
| AM2 | don't care | CM1 | don't care | 50% | 200 |
| | | CM2 | RSP>90 | 80% | 200 |
| | | | RSP≤90 | 95% | 400 |

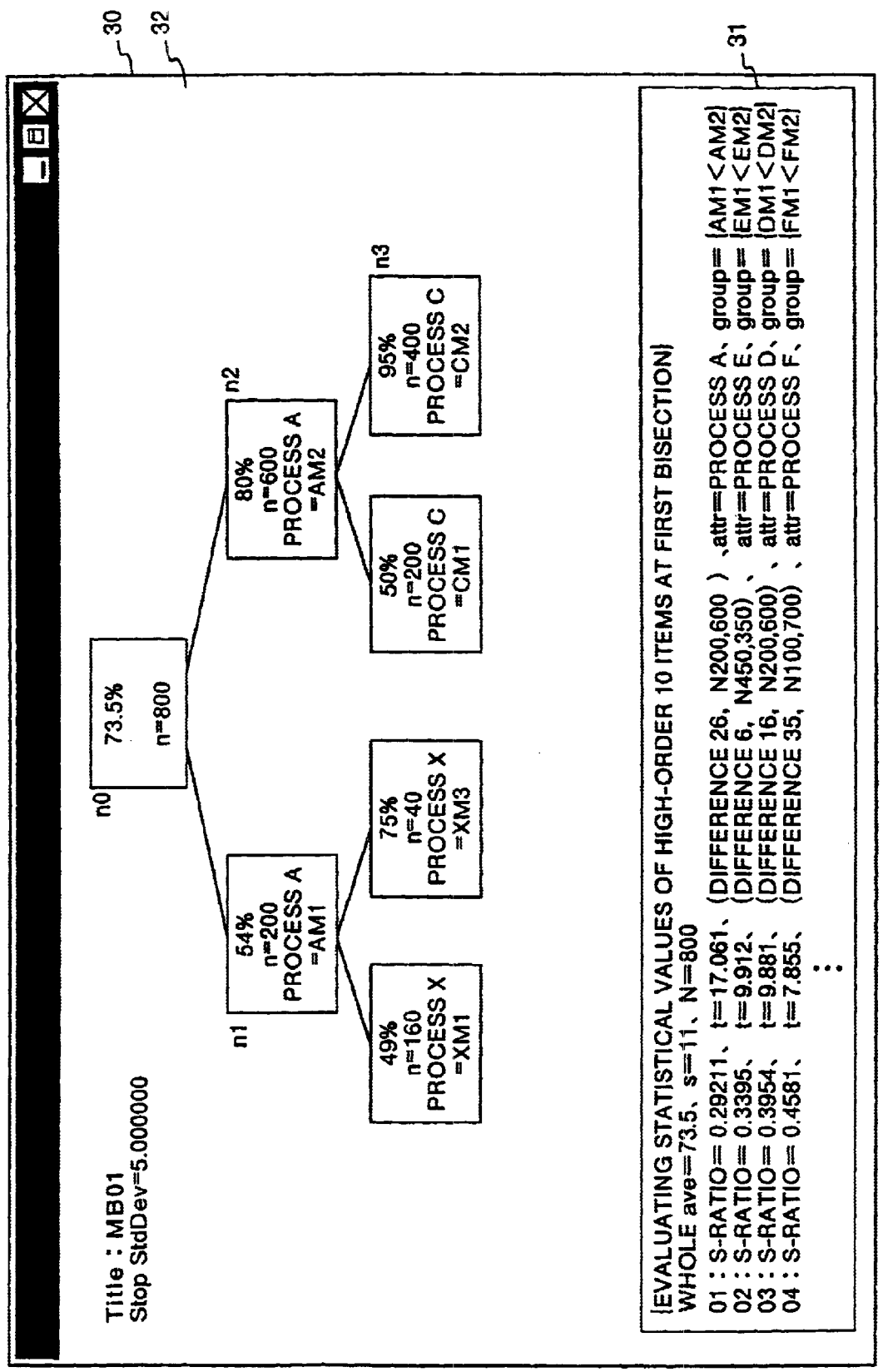

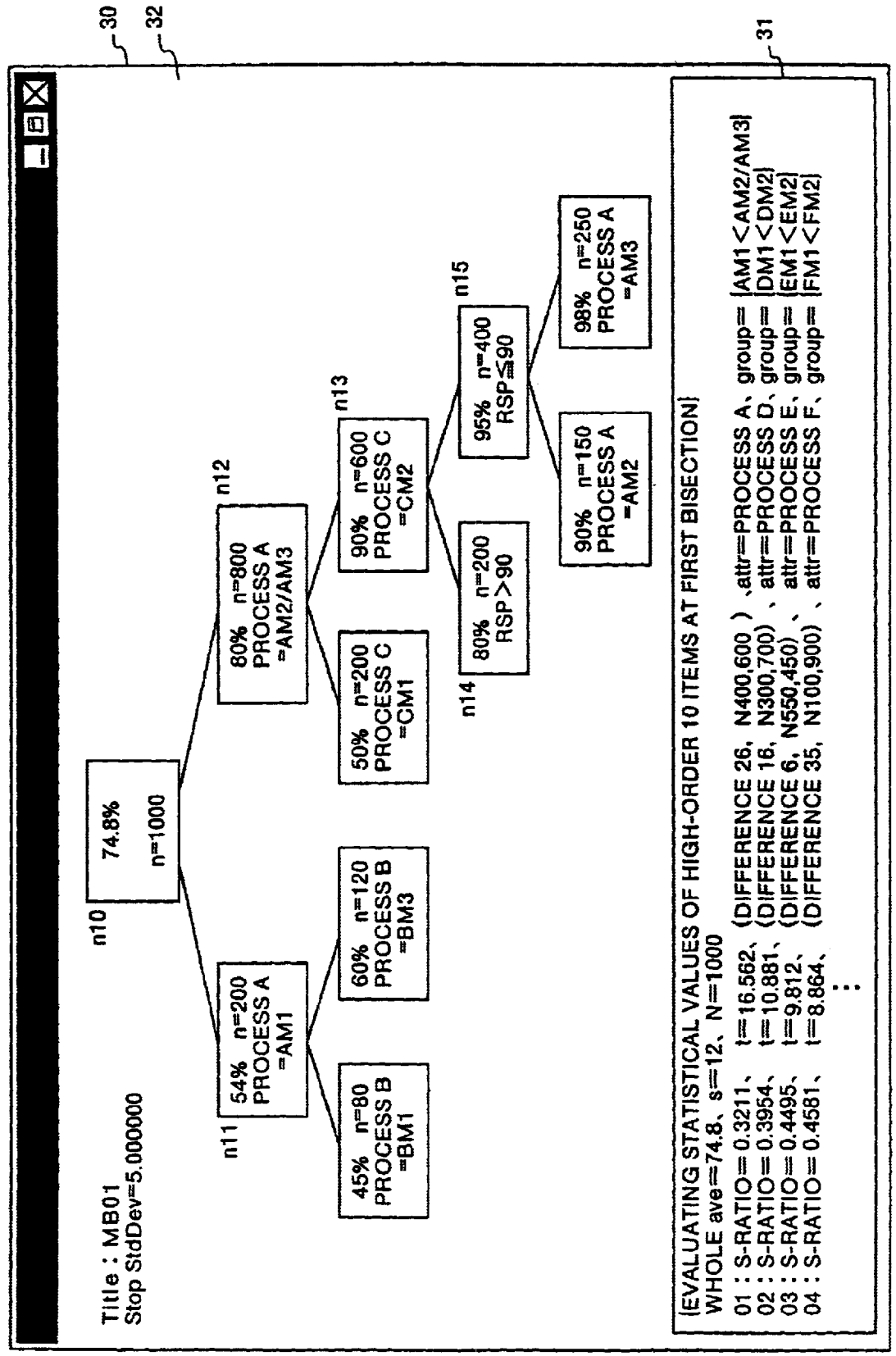

FIG.31

| WAFER NUMBER | PROCESS A | PROCESS B | ... | RSP | WET_J | OTHERS l | YIELD |
|---|---|---|---|---|---|---|---|
| WAFER 1 | DEVICE AM2 | DEVICE BM1 | ... | EVALUATION VALUE l1 | EVALUATION VALUE l1 | EVALUATION VALUE l1 | 0.805 |
| WAFER 2 | DEVICE AM1 | DEVICE BM1 | ... | EVALUATION VALUE l2 | EVALUATION VALUE l2 | EVALUATION VALUE l2 | 0.715 |
| ... | DEVICE AM1 | DEVICE BM2 | ... | EVALUATION VALUE l3 | EVALUATION VALUE l3 | EVALUATION VALUE l3 | 0.825 |
| WAFER j | DEVICE AM2 | DEVICE BM1 | ... | EVALUATION VALUE l4 | EVALUATION VALUE l4 | EVALUATION VALUE l4 | 0.605 |

– 1 –

METHOD AND DEVICE FOR ANALYZING DATA

FIELD OF THE INVENTION

The present invention in general relates to a technology for obtaining the relation between data values widely used in industrial fields and extracting a significant result for producing an industrially predominant result.

BACKGROUND OF THE INVENTION

In a semiconductor fabrication process, operations for finding out a yield-deterioration factor as quick as possible are performed in accordance with the history of a device used in a fabrication stage, test results, design information, and various measured data values in order to improve the yield.

Particularly, in the case of development of a new product or review of an existing fabrication process, it is important to extract variable information or regularity hidden in data from the above various original data groups in order to make a data analysis efficient and high reliable. Moreover, by integrating and studying the extracted information and regularity, it is possible to find a knowledge not easily found by an engineer and effectively use the knowledge to find a yield-deterioration factor. Data mining is a data analyzing method for realizing the above mentioned, particularly utilize in finance and circulation fields. Because these industrial fields use a large quantity of data, it is suitable to apply the data mining to the industrial fields.

FIG. 1 is a conceptual illustration showing a general data analyzing method to which data mining is not applied. In the case of the general data analyzing method, individual original data values extracted from databases 2a, 2b, . . . of an original data group 1 are directly analyzed by an analyzing tool group 3. According to the analysis result, decision making is performed. The analyzing tool group 3 includes a statistical analysis component 4a and a chart drawing component 4b.

FIG. 2 is a conceptual illustration showing a conventional data analyzing method executed in a semiconductor fabrication process. A conventional semiconductor fabrication process uses a general data analyzing method to which data mining is not applied. An original data group 5 is provided with a data base 6a for design data, a data base 6b for process data, a data base 6c for device data, and a data base 6d for test results and the like. Analysis-object data 7 is constituted of the original data extracted from the databases 6a, 6b, 6c, and 6d. The analysis-object data 7 is processed by a data processor 8 and data 9 for low-yield factors is obtained.

The analysis-object data 7 is extracted in accordance with an analysis procedure or layer. Data to be extracted or data to be used for an analysis is decided in accordance with the past know-how, experience, and skill of each engineer. That is, a decision data is left to the discretion of an engineer who performs an analysis. Moreover, the analysis result is shown in the form of a correlation diagram, trend graph, or histogram.

In general, a device-difference analysis is performed in order to clarify a yield-deterioration factor in a semiconductor fabrication process. FIG. 3 is a conceptual illustration showing the flow of a lot in the device-difference analysis and FIG. 4 is a box and whisker chart showing the yield value of a lot in the device-difference analysis every device used. The box and whisker chart is drawn for each fabrication process. In the case of the device-difference analysis, it is extracted which device most influences the yield in each fabrication process from the data for a device used for the process of each lot. Then, a process in which a yield difference is most remarkable and a device used are identified in accordance with an obtained box and whisker chart.

However, the above device-difference analysis has a problem that extremely large man-hour is required for the analysis because the number of fabrication processes is several hundreds at present. Moreover, when a difference between devices is not clearly obtained or conditions are complexly combined, there is a disadvantage that it is sometimes difficult to determine.

Furthermore, because an analysis is progressed in accordance with the past know-how, experience, or skill of each engineer in the case of a conventional analyzing art, it cannot be avoided that the efficiency or reliability of an analysis is unavoidable. Therefore, a data analysis art is desired which makes it possible to decrease the rate depending on the know-how, experience, or skill of an engineer, effectively use study of the knowledge for efficiently executing the analysis by each analyzing tool so that there is no leak and the study result, and even evaluate the accuracy of the study result.

FIG. 5 is a schematic view showing a configuration of records used for the data analysis of the classification analysis which is one of data mining methods. Generally, in the case of a data analysis, a variable purposing searching a fluctuation cause or fluctuation pattern is referred to as a purpose variable and a variable for explaining the fluctuation of purpose variables is referred to as an explanation variable. Records 10a, 10b, . . . , 10i are divided into purpose-variable data values 11a, 11b, . . . , 11i and explanation-variable data values 12a, 12b, . . . , 12i. The efficiency or reliability of an analysis is changed depending on an object used as purpose variables or explanation variables or a type of analysis to be performed. Therefore, it is necessary to evaluate the reliability or accuracy of an analysis.

To analyze the data for the yield of a semiconductor fabrication process in many cases, a purpose variable uses a yield and a explanation variable uses the history of a device used, test results, design information, and various measured data values. To more efficiently perform an analysis and improve the reliability of the analysis, it is necessary to perform the processing for clarifying the relation between purpose variables and an explanation variables in an original data group and an existing analyzing-tool group as shown in FIG. 1.

Data mining is effective as a method for clarifying the relation between purpose variables and explanation variables. FIG. 6 is a conceptual illustration for showing a general data analyzing method to which data mining is applied. In the case of the data analyzing method to which data mining is applied, a rule file 16 is generated by an device 15 for extracting processing of features and regularities hidden in data (data mining) in accordance with individual original data value extracted from data bases 14a, 14b, . . . of an original data group 13.

Then, individual original data value extracted from the data bases 14a, 14b, . . . is analyzed by an analyzing tool group 17 in accordance with the rule file 16. Decision-making is performed in accordance with the analysis result. The analyzing tool group 17 includes, for example, a statistical analysis component 18a and a chart drawing component 18b.

When applying data mining to a yield data analysis, an action for improving a yield is decided in accordance with a data mining result, it is determined whether to take action for that or not, or an action effect is estimated. For this, quantitative evaluation or accuracy of a data mining result is necessary.

A regression tree analysis is particularly effective among classification analyses of the data mining method. One of advantages of the regression tree analysis is that results are output as an comprehensible rule and expressed by a general language or a database language such as an SQL language. Therefore, by effectively using the reliability or accuracy of these results, it is possible to perform effective decision making or take actions in accordance with the result.

The regression tree analysis is described below. The regression tree analysis is applied to a set constituted of records comprising explanation variables showing a plurality of attributes and a purpose variable to be influenced by the explanation variable, which identifies an attribute which most influences the purpose variable and an attribute value. A rule showing the feature and regularity of data is output from a regression tree analysis engine.

The processing of the regression tree analysis is realized by repeatedly diving a set into two subsets in accordance with the attribute value of each attribute. When dividing, by assuming the sum of squares of purpose variables before divided as S0 and the sum of squares of purpose variables of two subsets after divided as S1 and S2, the attribute of a record for performing division so that $\Delta S$ shown by the following equation (1) is maximized and the attribute value of the record are obtained.

$$\Delta S = S0 - (S1 + S2) \qquad (1)$$

The attribute and attribute value obtained from the above equation correspond to a branch point of a regression tree. Subsequently, the same processing is repeated for divided subsets to examine influences of an explanation variable on a purpose variable. Therefore, an explanation variable located at a higher position from a branch more strongly influences a purpose variable. Then, when the standard deviation of purpose variables of divided subsets becomes smaller than a previously designated value, branching of the regression tree stops. Thus, influences of the attribute value of each attribute on a purpose variable is identified in accordance with a regression tree diagram obtained by repeating set division in accordance with the value of $\Delta S$.

However, when a subject to be analyzed relates to a fabrication process such as a semiconductor, there may be more than one actual low-yield factors. Moreover, there is a case in which a factor determined as a factor having the largest significant difference in a data analysis is not true in fact. This is because only a factor regarded to be most significant at each stage of set division, that is, only a factor having the maximum $\Delta S$ is output from a normal regression-tree-analysis engine. That is, the accuracy or reliability of an analysis is not sufficiently obtained.

On the other hand, data mining is frequently used in finance and circulation fields. Though data values used in these fields require a great number of records (e.g. POS data), most of the data values have a comparatively small number of explanation variables. However, the data obtained from a fabrication process has a large number of explanation variables though the number of records is small. Therefore, a method basically different from a conventional method is necessary for the accuracy and reliability of analysis results of data mining.

To apply data mining to the data for a fabrication process, the accuracy evaluation of data-mining results is important because fabrication conditions are changed depending on a data-mining result. Particularly, in the case of a fabrication process of device LSI products whose number of lots is small, the information for the above reliability and accuracy or for factors which may be factors from a secondary factor downward is important.

The accuracy evaluation of not only data mining but also a rule generally obtained as a classification analysis result of a multivariate analysis is performed in accordance with the following equation (2).

(Erroneous classification rate)=(Number of data values erroneously identified)/(Total number of data values)   (2)

FIG. 7A and FIG. 7B are illustrations for explaining the accuracy evaluation of a rule. In FIG. 7A and FIG. 7B, states are shown in which the data of A group provided with triangular marks and the data of B group provided with circular marks are identified by two explanation variables X1 and X2. In the case of the classification in accordance with the linear classification function shown in FIG. 7A, the circular mark (shown by symbol 19) present at the middle of B-group data is erroneously identified as A-group data. Therefore, an erroneous classification rate becomes $\frac{1}{12}$.

However, in the case of the classification in accordance with the Mahalanobis' distance shown in FIG. 7B, every circular mark is correctly identified. Therefore, the erroneous classification rate becomes zero. It is possible to evaluate a data-mining result with the same method depending on the type of data or analysis content. However, because a data quantity is large, a method according to sampling or cross validation may be used.

In these evaluation methods, it is assumed that the attribute of each data value is completely already known and it is possible to determine whether a classification analysis result is correctly identified. However, it is impossible to identify a true state from the viewpoint of the property of process data and the accuracy evaluation according to an erroneous classification rate does not make sense.

Moreover, even if an erroneous classification rate is defined by adding any prerequisite, it is impossible to apply a conventional evaluation method to process data in many cases because process data has the particularity that the number of data values is small and the number of explanation variables is large. That is, a method for obtaining the information about the reliability and accuracy of a data mining result of process data is not established yet.

Therefore, it is necessary to develop an evaluation method applicable to a data mining result of process data or the like. Moreover, because an obtained data-mining result does not always show a true state, it is preferable to obtain the information about other possible factors as factors from a secondary factor downward. Furthermore, most data-mining algorithms conform to multivariate analysis and it is difficult to make an end user unfamiliar with a statistical method understand the analysis result. Therefore, an comprehensible criterion is necessary.

Furthermore, analysis of process data uses the history of a device used, test results, design information, and various measured data values as explanation variables as described above. However, the history of a device used, test results, design information, and various measured data values are data species included in different types of item groups (categories), i.e., data species of different type. In general, in the case of a conventional process-data analyzing method, it is difficult to separate or decrease influences of explanation variables included in another item group. Therefore, the relation with a yield value serving as a purpose variable is analyzed only for an explanation variable included in a signal item group. Therefore, obtained each analysis result relates to an explanation variable included in a signal item group.

For example, in the conventional analyzing method, when using an explanation variable as the history of a device used in each process, the influence on a yield due to a difference between devices in each process is only known. Moreover, when using an explanation variable as electrical-characteristic data, only the information showing influences of any electrical-characteristic data value on a yield is obtained. That is, in the conventional analyzing method, the information on the relation between explanation variables while lying across explanation variables of different item groups or included in different item groups cannot be obtained. Moreover, the relation between an analysis result of a certain item group and an analysis result of another item group or the information for the difference between influential degrees of explanation variables included in different item groups on purpose variables cannot be obtained.

Therefore, even if it is clarified by the conventional analyzing method that a difference between devices occurs, the influential degree of electrical characteristic data on a yield may be actually larger than influences of the difference between devices or the difference between devices may not actually occur compared to an analysis result obtained through noises. In this case, even if taking action for the difference between devices by referring to an analysis result of the history of a device used, the action is not very effective.

Particularly, recently, because a device or the like is further fined and data in the world is further complicated, failure factors due to design or fabrication factors are complexly interwound each other and the history of a device used, test results, design information, and various measured data values reflecting the above mentioned are not independent of each other but they are complexly interwound each other. Therefore, even if simply analyzing the influence on a yield value every item, an actual phenomenon is not always accurately shown.

Therefore, a data analyzing method and a data analyzing device are necessary which can perform analysis while lying across the data of different item groups and thereby obtain the fact that an explanation variable included in any item group and effective for a purpose variable under a state of less noises. However, there is not any method for obtaining the relation between explanation variables included in different item groups or for knowing how the explanation variables are interwound each other.

SUMMARY OF THE INVENTION

It is an object of the present invention to provide a data analyzing device and a data analyzing method capable of evaluating the reliability and accuracy of a data mining result of the process data or the like particularly obtained in a semiconductor fabrication process or capable of quantitatively evaluating effective factors from a secondary factor downward.

It is another object of the present invention to provide a data analyzing device and a data analyzing method capable of performing an analysis under a state of less noises by handling a plurality of items different from each other in belonging item group as explanation variables simultaneously in parallel and analyzing a set included or not included in a watched node of a regression tree diagram based on an extracted rule.

According to one aspect of the present invention, a data processing section extracts a rule present between a plurality of original data values of an original data group by to generate a reliability-information-provided rule file to which the information showing the reliability of the rule is added. The extracted rule is output together with the information showing the reliability of the rule. Then, the original data is analyzed in accordance with the rule file by an analyzing tool.

A statistical method such as a data mining technique is utilized for extracting the rule present between original data values. Moreover, a set-division evaluation value is obtained which shows the clearness of division when dividing a set constituted of a plurality of original data values into to two subsets. The information showing the reliability of the rule can also use the information including factors or conditions from a secondary factor or condition downward.

Moreover, the original data includes purpose variables purposing the search of fluctuation causes or fluctuation patterns and explanation variables for explaining the fluctuation of the purpose variables. When applying the present invention to a device for analyzing yield deterioration factors in a fabrication process, a purpose variable uses a fabrication yield. Moreover, explanation variables use the history of a device used, test results, design information, and measured data.

Moreover, an S-ratio is set as one of set-division evaluation values. When assuming the sum of squares of purpose variables before dividing a set constituted of a plurality of original data values into two subsets as S0 and the sums of squares of purpose variables of subsets after dividing as S1 and S2, the S-ratio is shown by the following equation (3).

$$S\text{-ratio} = ((S1+S2)/2)/S0 \qquad (3)$$

The S-ratio is a reduction rate of the sum of squares according to set division and a parameter showing a reduction rate of the sum of squares by set division. As the S-ratio decreases, the effect of set division increases. That is, because this represents that set division is clearly performed, a difference between devices increases.

Moreover, a t-value is set as one of set-division evaluation values. This value is used for the examination of the difference between averages of subsets after divided. When assuming the sums of squares of purpose variables of sets obtained by dividing a set constituted of a plurality of original data values into two subsets as S1 and S2, the numbers of factors of subsets after divided as N1 and N2, and averages of subsets after divided as /X1 and /X2 (symbol "/" before X denotes a bar), a t-value is shown by the following equations (4) and (4)'.

$$t = \frac{|\overline{X1} - \overline{X2}|}{\sqrt{\frac{S1+S2}{N1+N2-2} \times \left(\frac{1}{N1} + \frac{1}{N2}\right)}} \qquad (4)$$

$$t = \frac{|\overline{X1} - \overline{X2}|}{\sqrt{\frac{S1}{N1^2} + \frac{S2}{N2'}}} \qquad (4')$$

Equation (4) is applied when there is no significant difference between variances of divided sets and equation (4)' is applied when there is a significant difference between variances of divided sets.

A t-value is a value for examining the difference between two population means of sets respectively divided into two subsets and serves as a criterion showing a significant difference between average values of purpose variables of divided sets. When the same degree of freedom, that is, the same number of data values represents that a set is more clearly divided as a t-value increases and therefore, a difference between devices increases.

Moreover, it is allowed to use a configuration in which each record of original data has a plurality of items included in different types of a plurality of item groups as explanation variables and a set included or not included in a watched node of a regression tree diagram based on an extracted rule is analyzed.

According to the present invention, a reliability-information-provided rule file to which the information showing the reliability of a rule is added is generated in the rule present between a plurality of original data values of an original data group. The generated rule and the information showing the reliability are output. Then, original data is analyzed in accordance with the generated rule file. Therefore, it is possible to evaluate the accuracy of an extracted rule and obtain effective factors from a secondary factor downward together with quantitative evaluation values of the factors (S-ratio and t-value).

Moreover, according to the present invention, it is possible to obtain explanation variables influencing purpose variables while lying across different item groups together with reliability information by handling a plurality of items included in different item groups as explanation variables simultaneously and executing a regression tree analysis. As a result, it is possible to obtain the information showing the data of an item group influencing a purpose variable as an explanation variable.

Moreover, because an explanation variable located at a higher position on a regression tree diagram has a larger influential degree on a purpose variable, it is possible to perform an analysis under a state excluding the influential degree due to an item having an influential degree larger than that of the item of a watched node by analyzing a set included or not included in the watched node.

Furthermore, by analyzing original data excluding the data for a node lower than the watched node, it is possible to perform an analysis under a state excluding the influential degree of an item having an influential degree smaller than that of the item of the watched node.

Other objects and features of this invention will become apparent from the following description with reference to the accompanying drawings.

BRIEF DESCRIPTION OF THE DRAWINGS

FIG. 6 is a conceptual illustration showing a data analyzing method to which data mining is applied;

FIG. 9 is a schematic illustration showing a data format when applying the present invention to the yield analysis of a semiconductor fabrication process;

FIG. 16 is a table simultaneously showing results of the regression tree analysis shown in FIG. 15;

FIG. 20 is a screen display showing a result of executing a regression tree analysis every type of product in the embodiment;

FIG. 21 is a screen display showing a result of executing a regression tree analysis every type of product in the embodiment;

FIG. 22 is a screen display showing a result of executing a regression tree analysis over various type of product in the embodiment;

FIG. 23 is a screen display showing a result of executing a regression tree analysis over various type of products in the embodiment;

FIG. 24 is a schematic illustration showing a data format used for inputs of a regression tree analysis covering a plurality of different types of item groups in the embodiment;

FIG. 26 is a table simultaneously showing results of the regression tree analysis shown in FIG. 25;

FIG. 29 is a screen display showing a result of executing a regression tree analysis while reducing influences of electrical-characteristic data in accordance with the regression tree analysis results shown in FIG. 25;

FIG. 30 is another screen display showing a result of applying a regression tree analysis to a plurality of different types of item groups in the embodiment;

FIG. 31 is a schematic illustration showing another data format used for inputs of a regression tree analysis covering a plurality of different types of item groups in the embodiment.

DESCRIPTION OF THE PREFERRED EMBODIMENTS

A preferred embodiment of the present invention is described below in detail by referring to the accompanying drawings.

Figure 8:
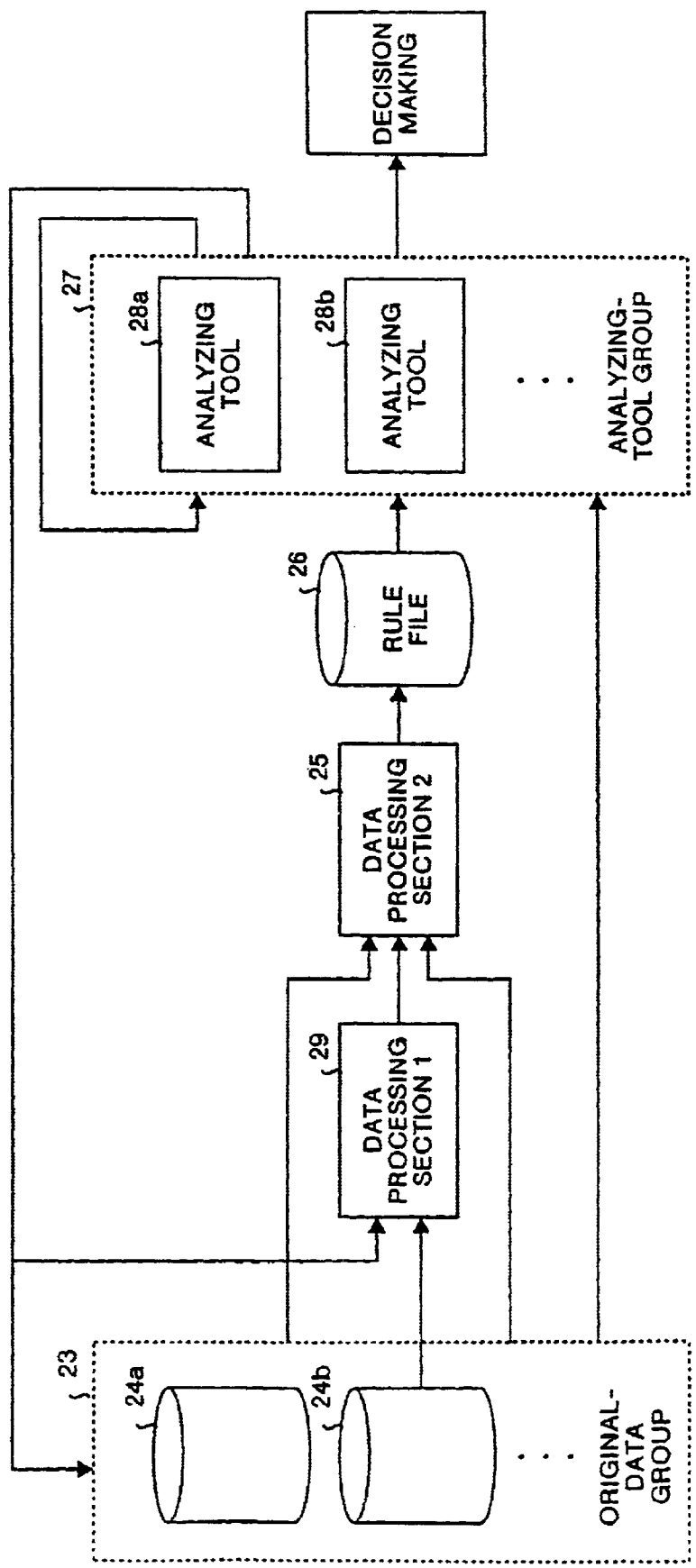
FIG. 8 is a schematic view showing a configuration of a data analyzing device of the present invention.

FIG. 8 is a schematic view showing a configuration of a data analyzing device of the present invention. The data analyzing device is provided with an original data group 23 constituted of data bases 24a, 24b, . . . respectively including a plurality of original data values. Moreover, the data analyzing device is provided with a first data processing section 29 for extracting a combination of optional data species or optional data items from the original data group 23 as data to be processed. The first data processing section 29 has a function as a front-data-processing section.

Moreover, the data analyzing device is provided with a second data processing section 25 for extracting processing of a rule of features and regularities hidden in data (data mining) in accordance with individual original data value extracted from the original data group 23 by the first data processing section 29 or all original data values included in the original data group 23. The second data processing section 25 extracts a rule and generates a reliability-information-provided rule file 26 to which the information showing the reliability of the rule is added.

The extracted rule is output as a screen display of a not-illustrated display unit or a document printed by a not-illustrated printer together with reliability information. Then, the original data of the original data group 23 is analyzed by analyzing tools 28, 28b, . . . of the analyzing-tool group 27 in accordance with the reliability-information-provided rule file 26. Decision-making is performed in accordance with the analysis result.

FIG. 9 is a schematic view showing a data format of original data when applying the present invention to the yield analysis of a semiconductor fabrication process. The data output from the original data group 23 takes data of each lot as one record and uses the name of a device used in each process of each lot as an explanation variable. A purpose variable uses a yield. The data of this format becomes input data of a classification analysis engine that is one method of data mining.

A case is described below in which the present invention is applied to the yield analysis of a semiconductor fabrication process and a regression tree analysis is used as the classification analysis of data mining. The outline of the regression tree analysis is omitted because it is already described.

Figure 10:
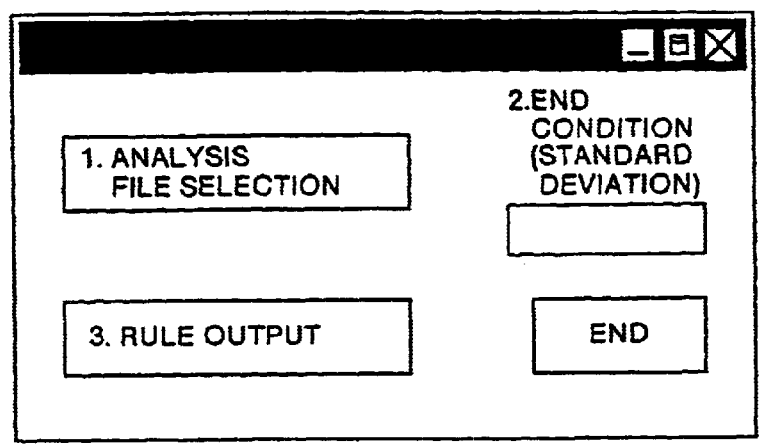
FIG. 10 is an illustration showing a screen display at start of a regression tree analysis program according to one embodiment of the present invention.
Figure 11:
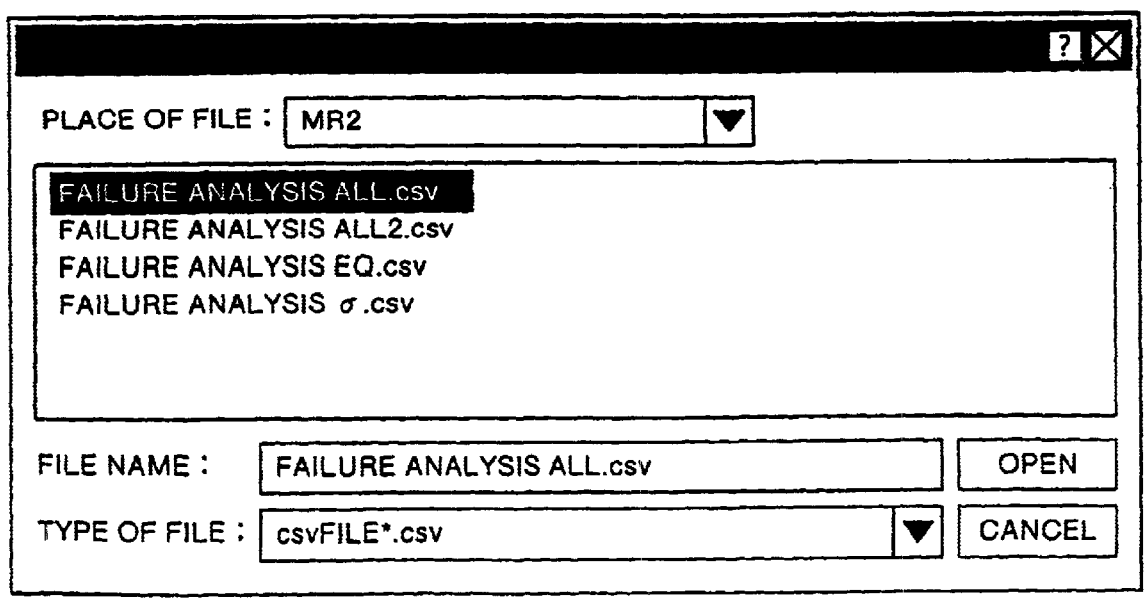
FIG. 11 is an illustration showing a screen display under execution of a regression tree analysis program of the embodiment.
Figure 12:
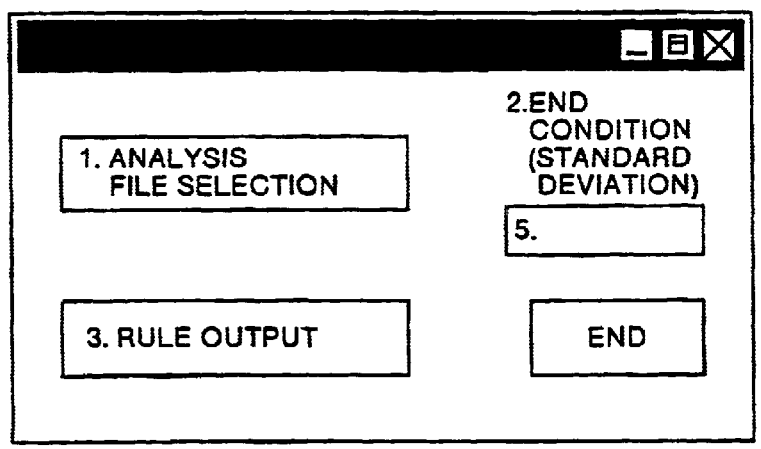
FIG. 12 is an illustration showing a screen display under execution of a regression tree analysis program of the embodiment.
Figure 13:
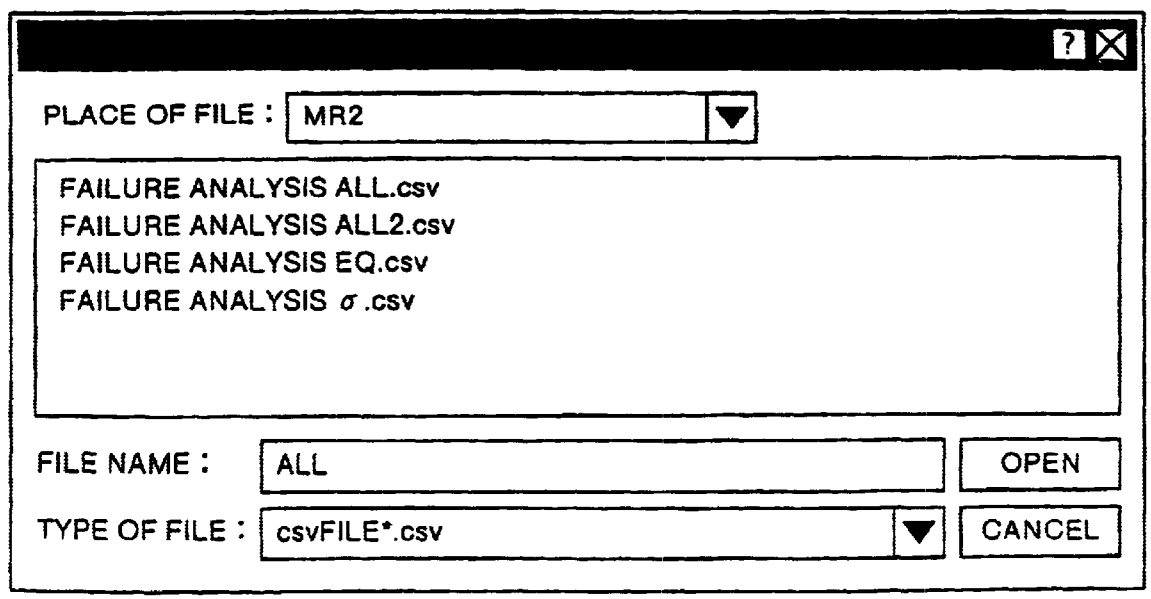
FIG. 13 is an illustration showing a screen display under execution of a regression tree analysis program of the embodiment.
Figure 14:
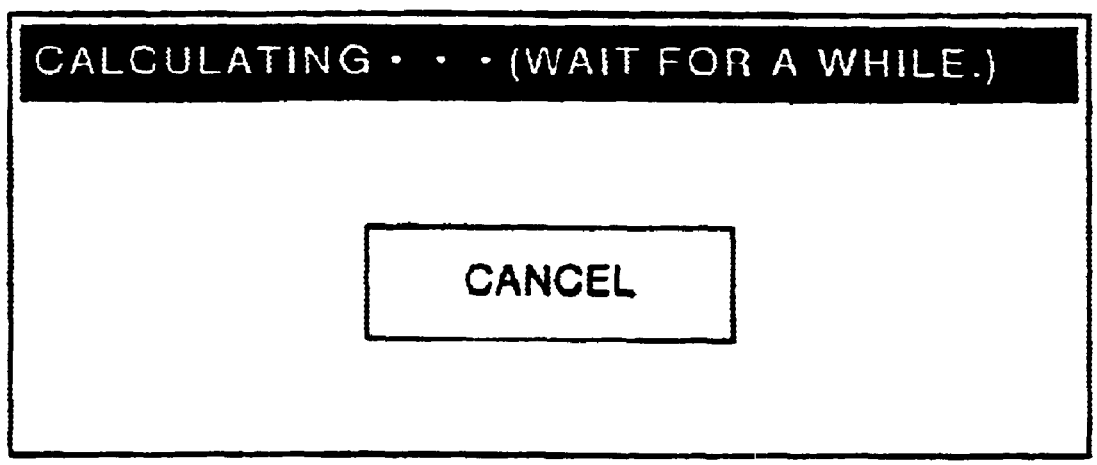
FIG. 14 is an illustration showing a screen display under execution of a regression tree analysis program of the embodiment.

FIG. 10 to FIG. 14 are illustrations showing screen displays at start of or under execution of a regression-tree-analysis program. FIG. 10 is a screen display when the program is started and FIG. 11 is a screen display when an analysis file is selected. FIG. 12 is a screen display at the time of designation of a standard deviation that is a program end condition. When the standard deviation of purpose variables of a set divided into two subsets becomes smaller than the value designated in the standard-deviation designation screen shown in FIG. 12 under execution of a regression tree analysis, branch of a regression tree stops. FIG. 13 is a screen display when a folder for outputting a rule which is a data processing result is designated and FIG. 14 is a screen display under execution of a program.

Basic Analyzing Method

Figure 15:
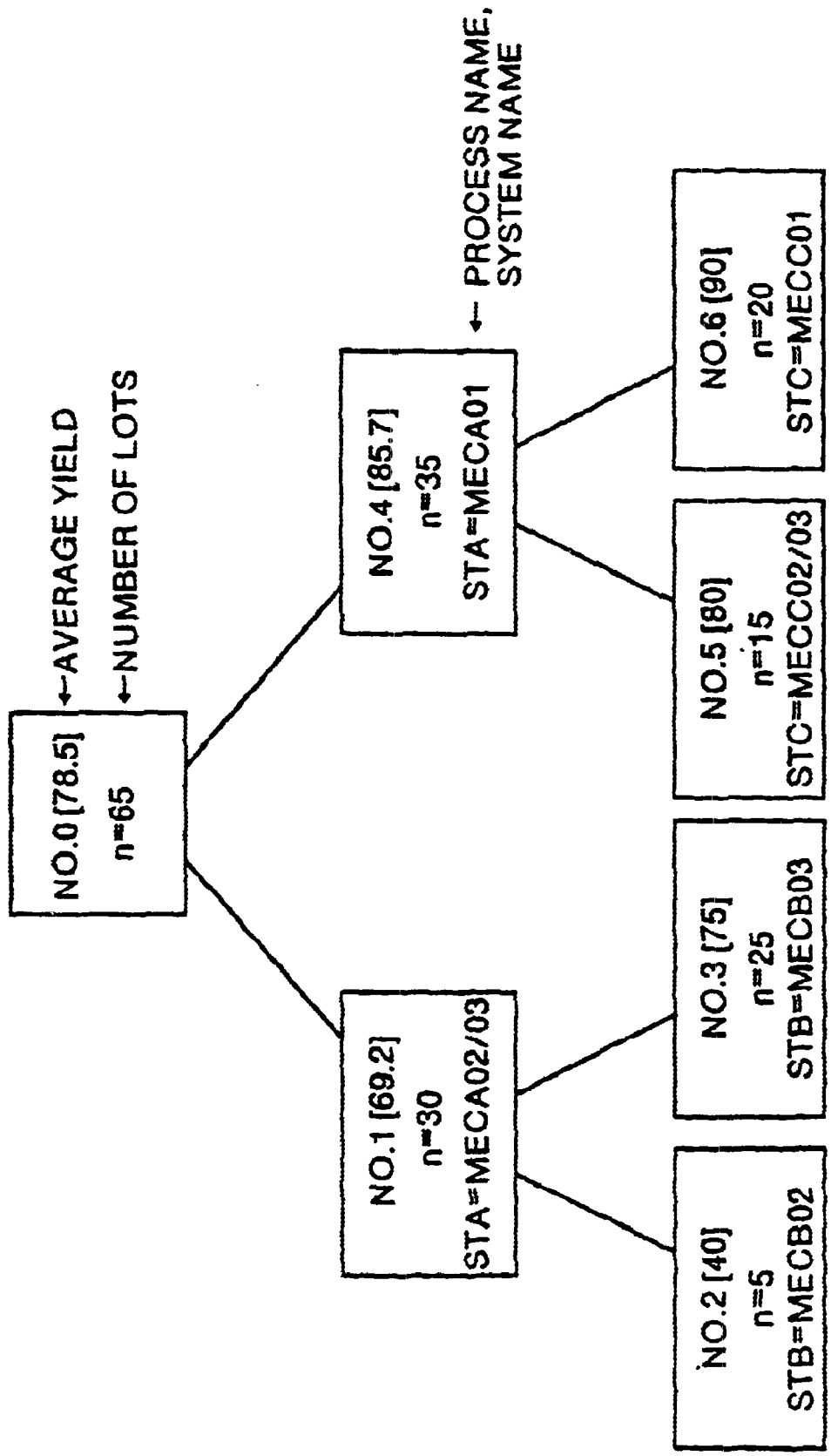
FIG. 15 is a regression tree diagram for explaining an analysis result by a regression tree analysis program of the embodiment.
Figure 17:
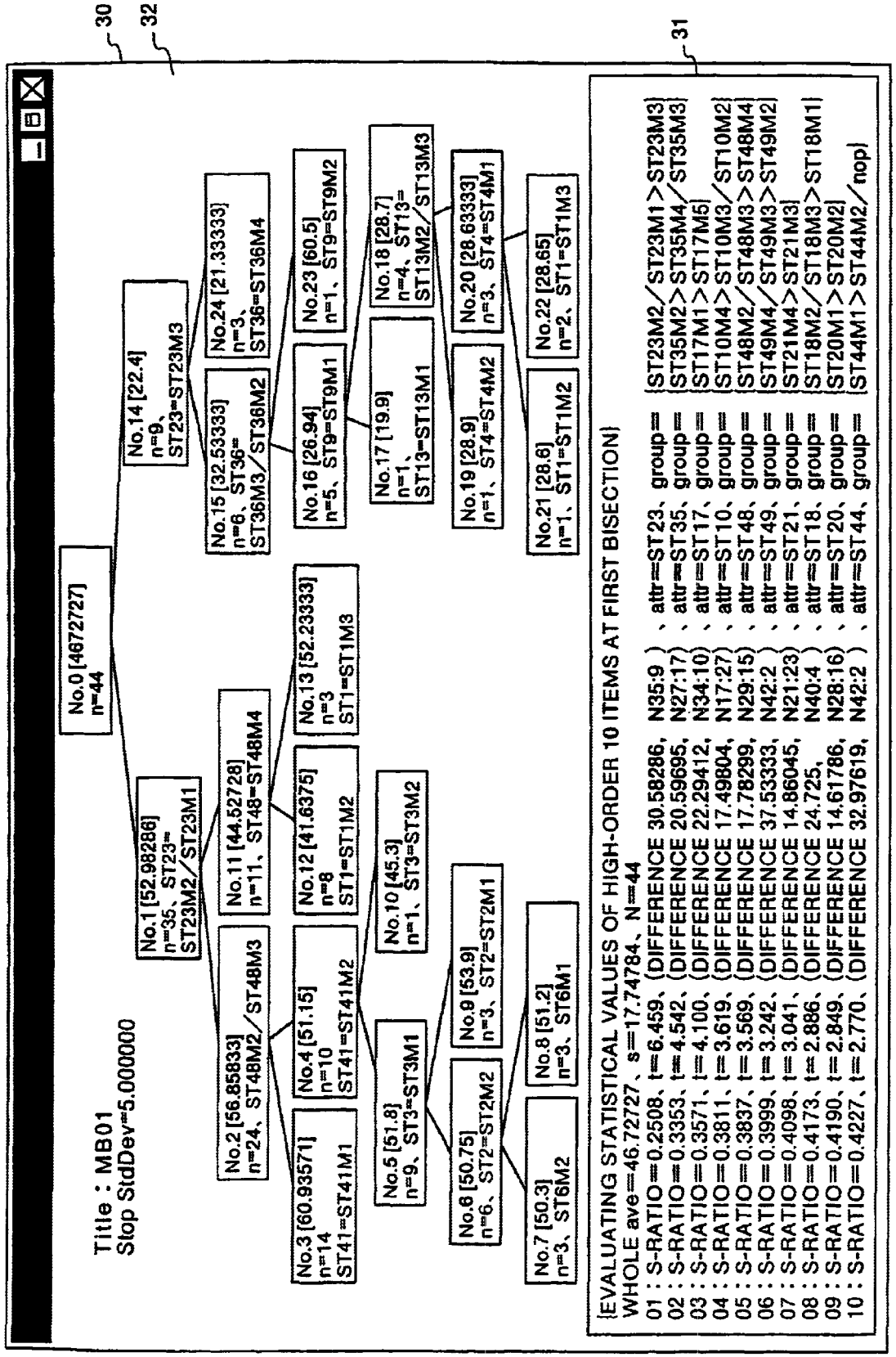
FIG. 17 is a screen display showing a result of executing a regression tree analysis every type of product in the embodiment.
Figure 18:
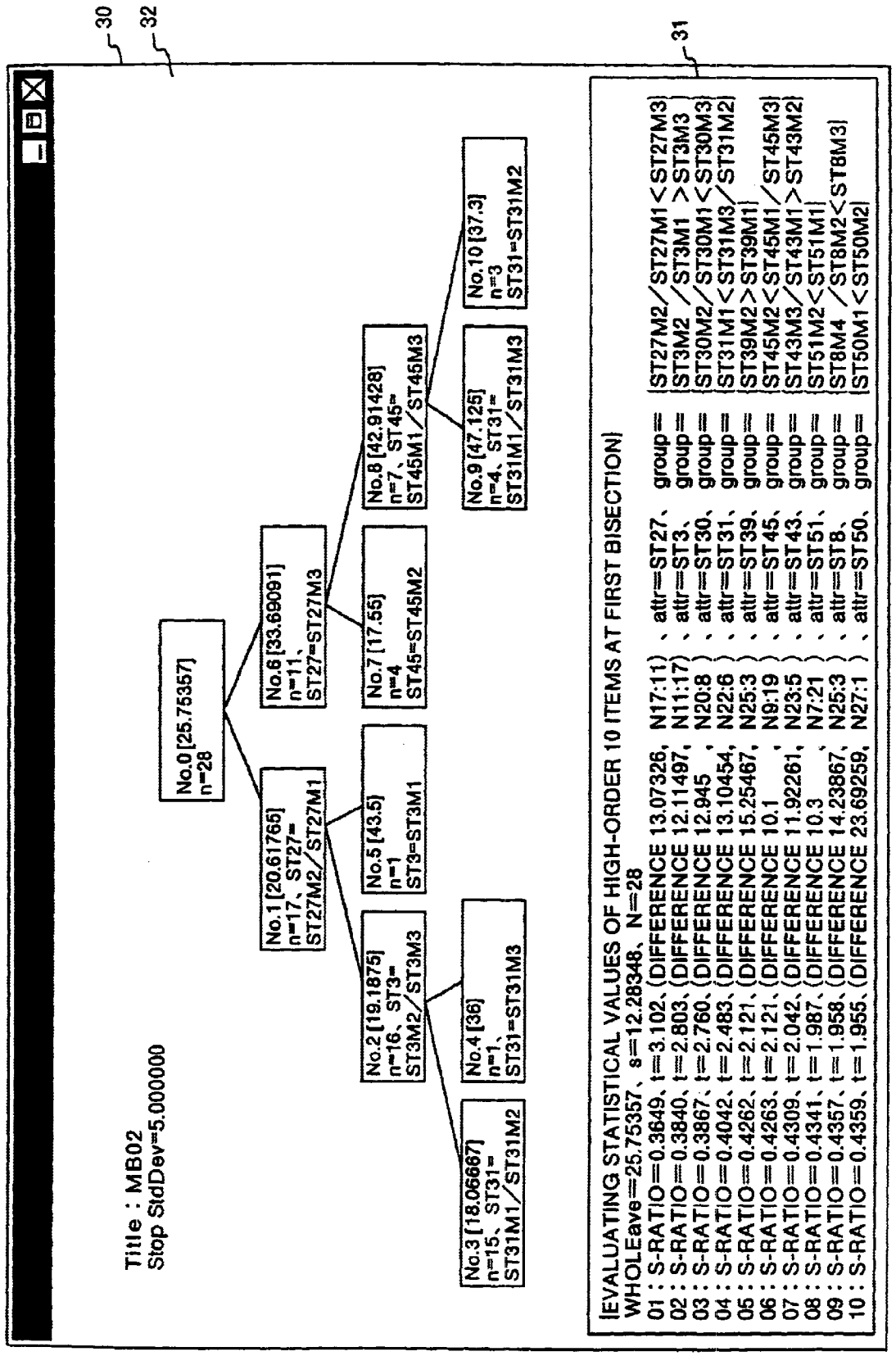
FIG. 18 is a screen display showing a result of executing a regression tree analysis every type of product in the embodiment.
Figure 19:
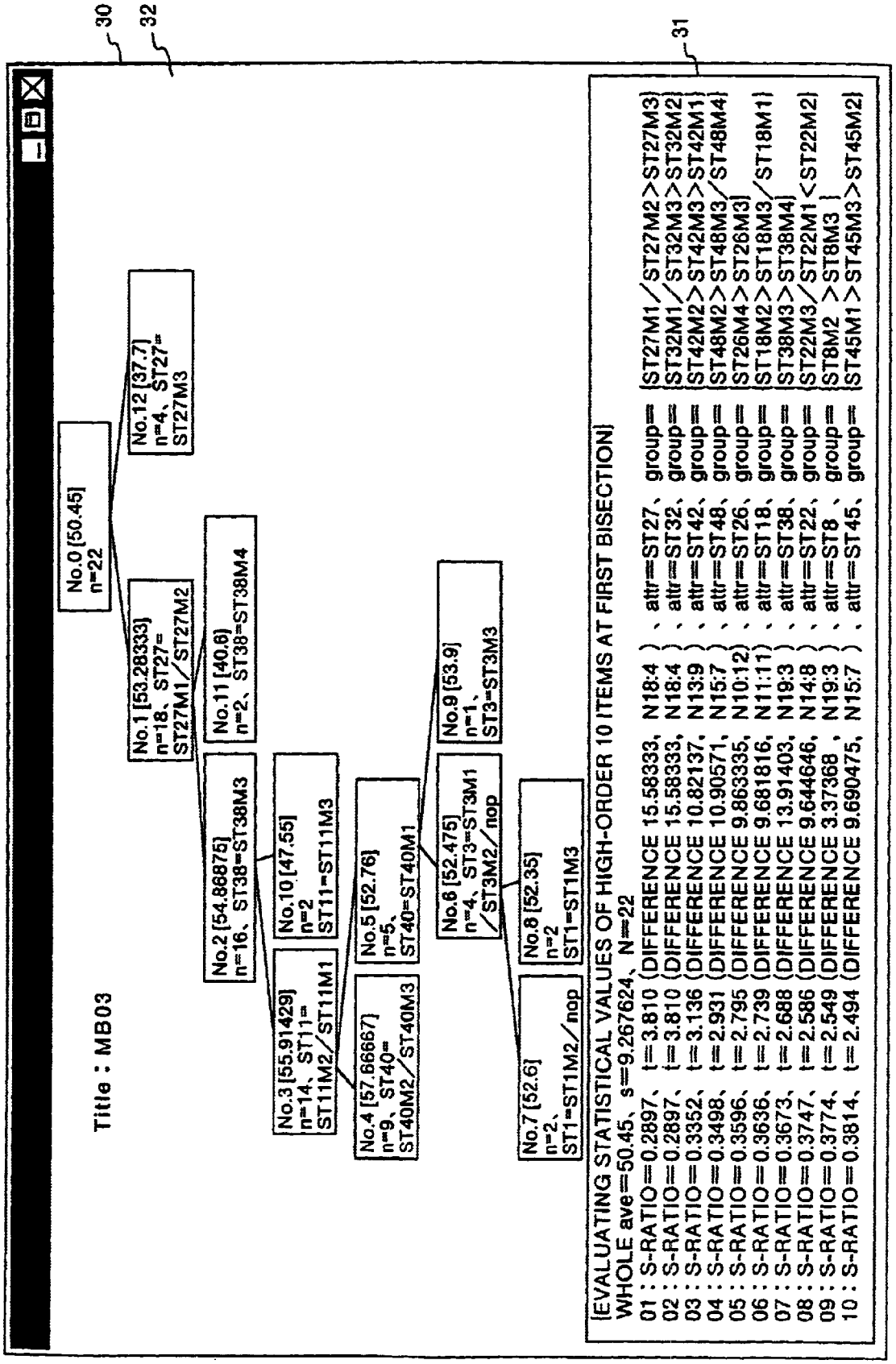
FIG. 19 is a screen display showing a result of executing a regression tree analysis every type of product in the embodiment.

FIG. 15 is an illustration showing a regression tree diagram for explaining a regression-tree-analysis result. How to read a regression tree diagram is described below by referring to the example shown in FIG. 15. In this case, however, an illustration of reliability information output together with a regression tree diagram and its description are omitted in order to simply explanation. The reliability information will be described later. Moreover, in FIG. 15, symbol n at each node in the regression tree diagram denotes the number of lots concerned.

The average yield of all lots is 78.5%. The average yield of lots using a device MECA01 in STA process is 85.7% and the average yield of lots using a device MECA02/03 is 69.2%. In the case of the illustrated example, lots using MECA01 tend to have a higher yield. In this case, MECA02/03 represents that either of two devices MECA02 or MECA03 is used (the same is true for MECC02/03).

Therefore, a yield is most influenced by a device used in all purposed processes in accordance with the fact that either of MECA01 or MECA02/03 is used among three devices MECA01, MECA02, and MECA03 in STA process.

Then, in the case of only lots using MECA01 in the STA process, the average yield of lots using MECC01 in STC process is 90% and the average yield of lots using MECC02/03 is 80%. Therefore, a yield in a lot group using MECC02/03 is most influenced by the fact that either of MECC01 or MECC02/03 is used among three devices MECC01, MECC02, and MECC03 in STC process.

Moreover, in the case of only lots using MECA02/03 in STA process, the average yield of lots using MECB03 in STB process is 75% and the average yield of lots using MECB02 is 40%. Therefore, a yield in a lot group using MECA02/03 is most influenced by the fact that either of MECB02 or MECB03 is used in STB process.

FIG. 16 is a table simultaneously showing results of the regression tree analysis in FIG. 15. As shown in FIG. 16, from the regression tree diagram in FIG. 15, it is found that the highest yield (90%) is obtained when using MECA01 in STA process and MECC01 in STC process. However, it is found that the lowest yield (40%) is obtained when using MECA02/03 in STA process and MECB02 in STB process. These facts are clarified as a result of data mining, that is, a rule.

Figure 1:
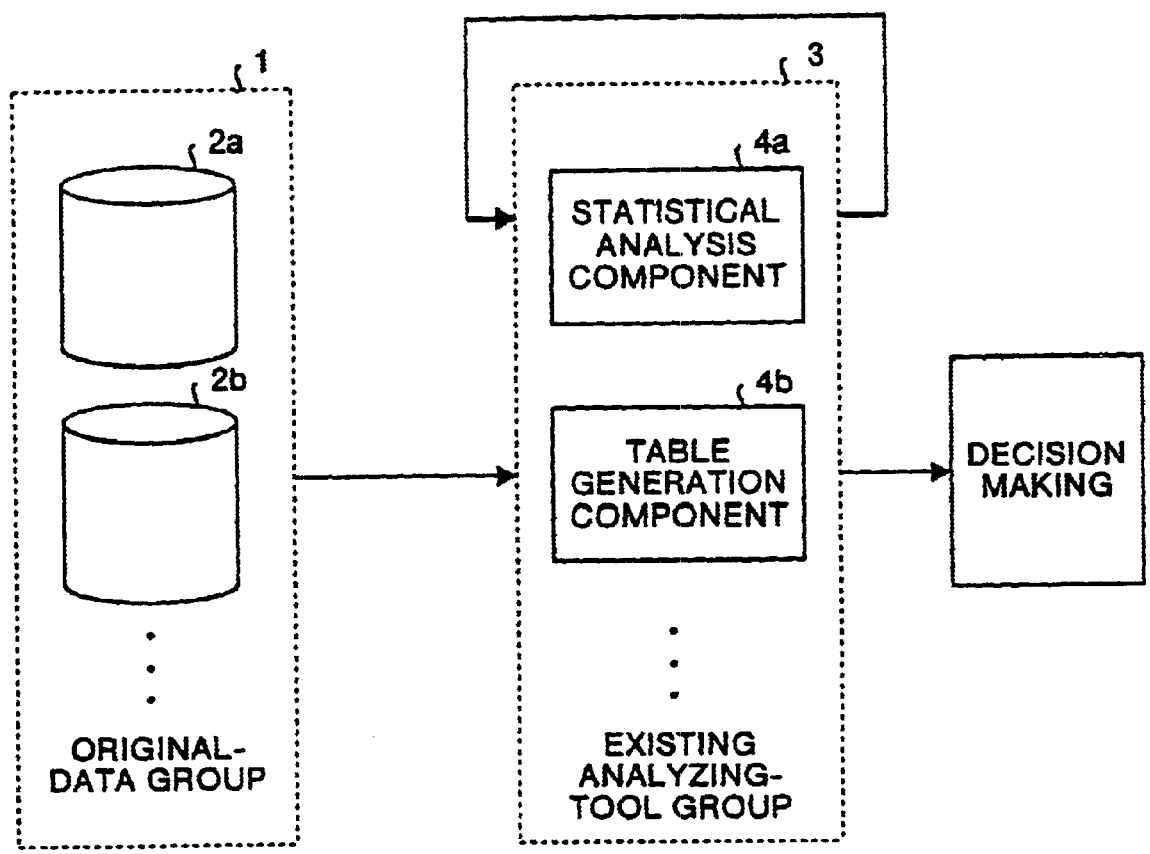
FIG. 1 is a conceptual illustration showing a general data analyzing method to which data mining is not applied.
Figure 2:
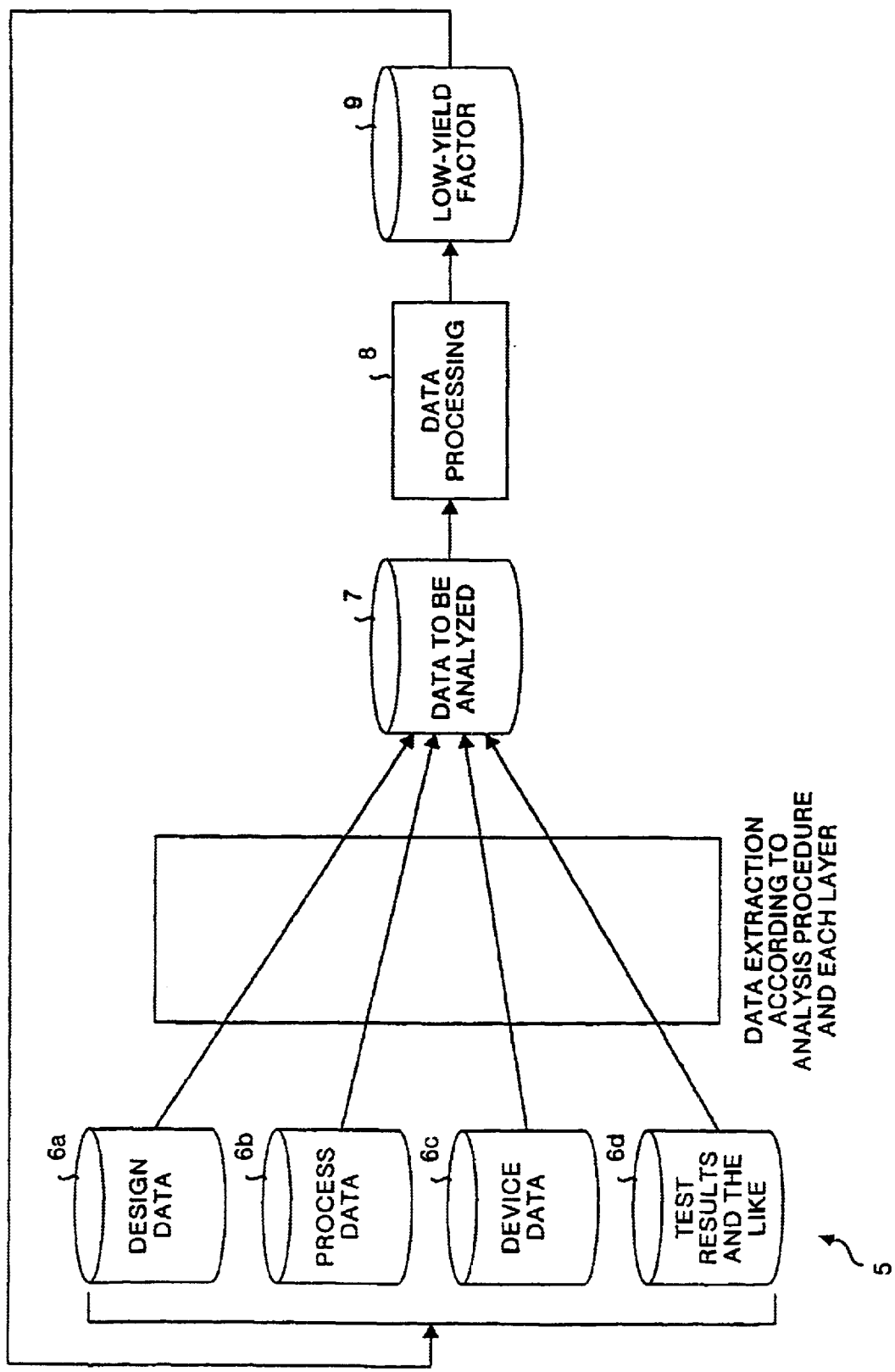
FIG. 2 is a conceptual illustration showing a conventional data analyzing method executed in a semiconductor fabrication process.
Figure 3:
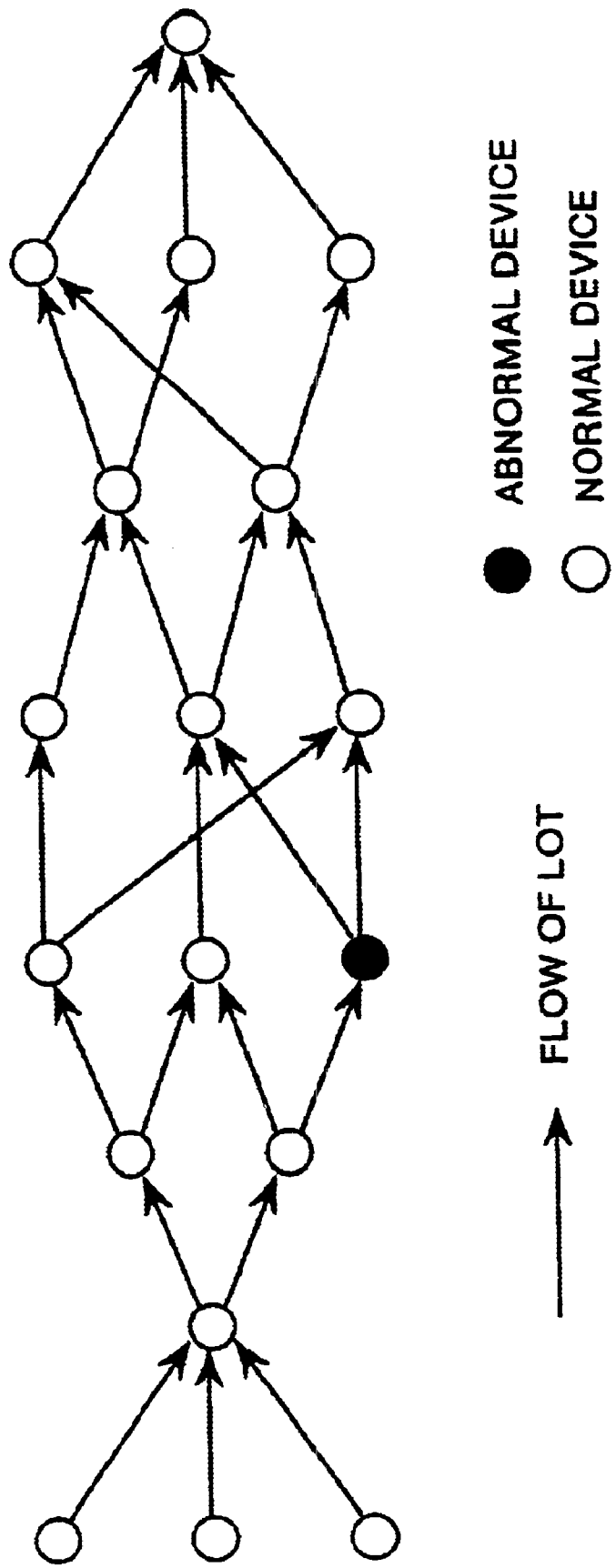
FIG. 3 is a conceptual illustration showing flows of lots in a conventional analysis of a difference between devices.
Figure 4:
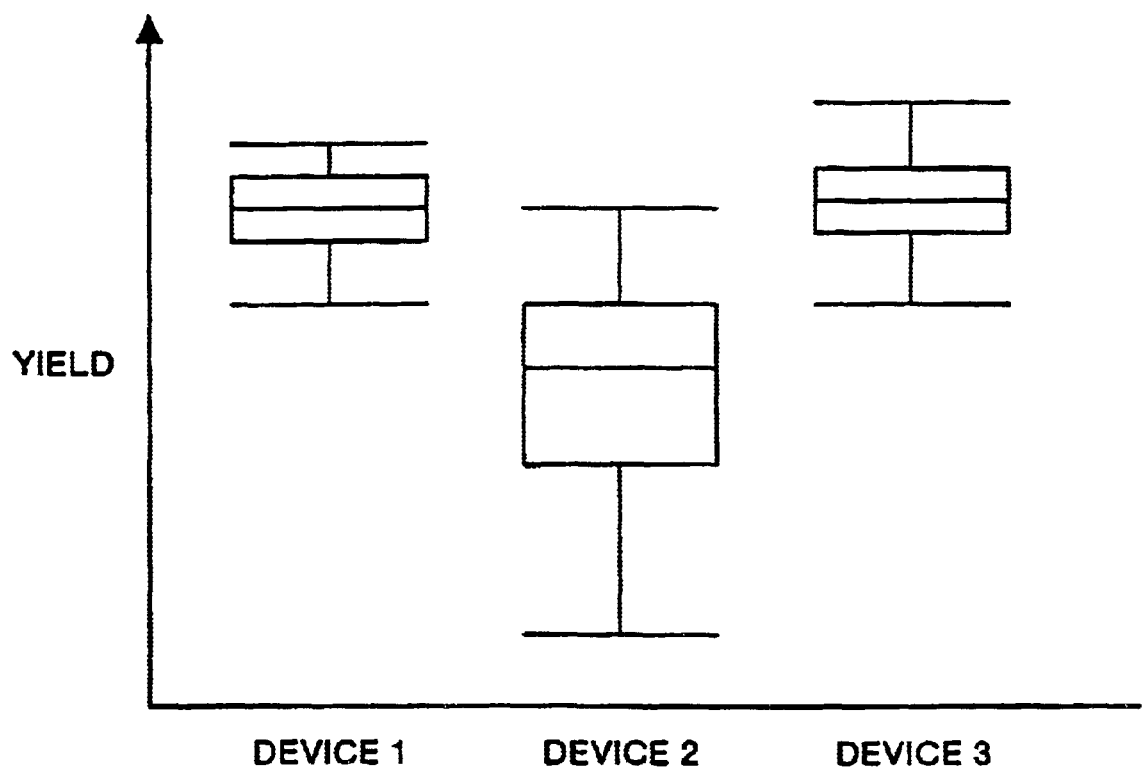
FIG. 4 is a box and whisker chart generated in a conventional analysis of a difference between devices.
Figure 5:
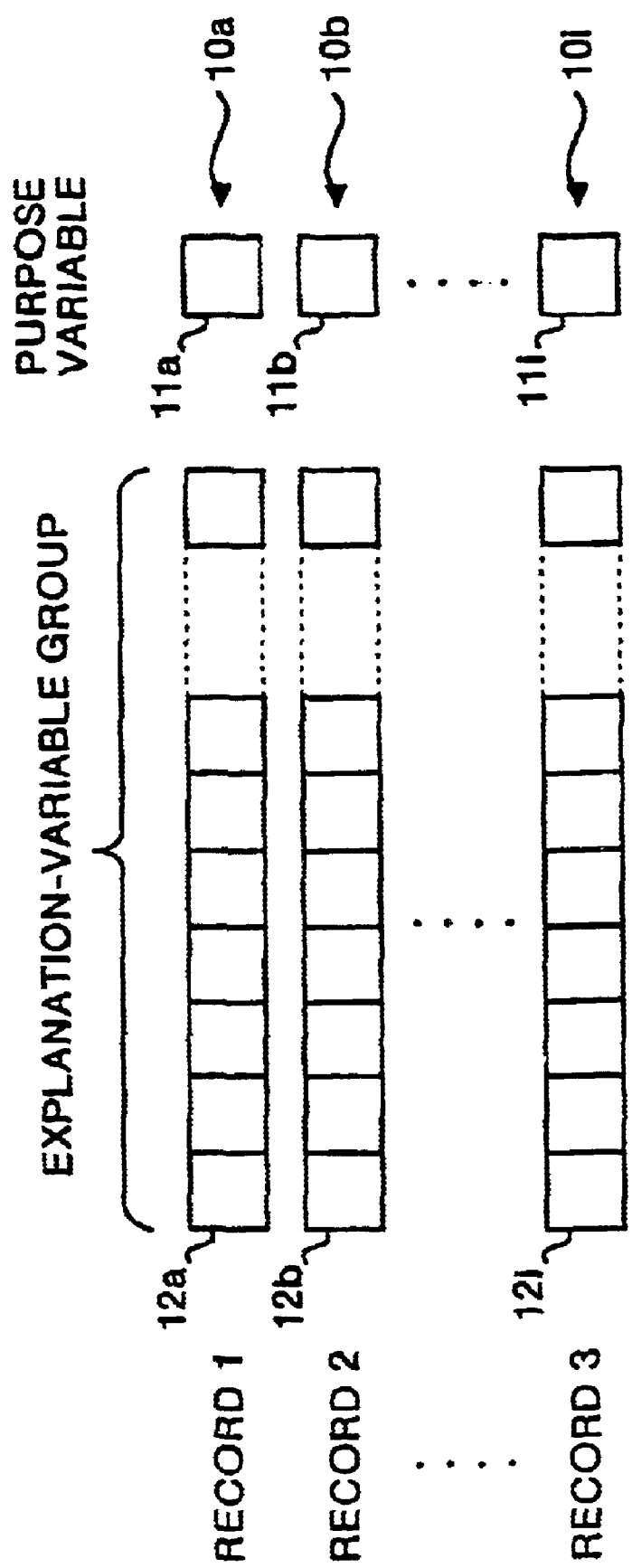
FIG. 5 is a schematic illustration showing a configuration of records used for a general data analysis.
Figure 7A:
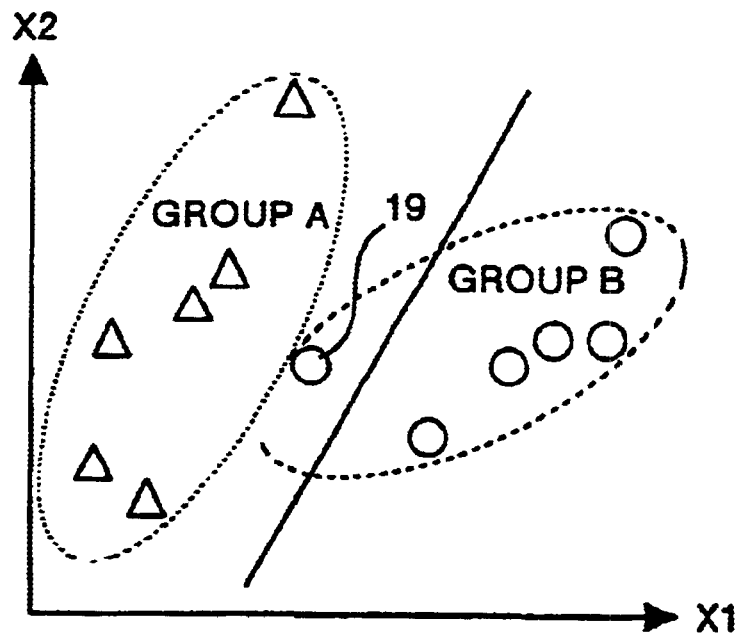
FIG. 7A and FIG. 7B are illustrations for explaining the evaluation of the accuracy of a rule obtained as a classification-analysis result in a general multivariate analysis.
Figure 7B:
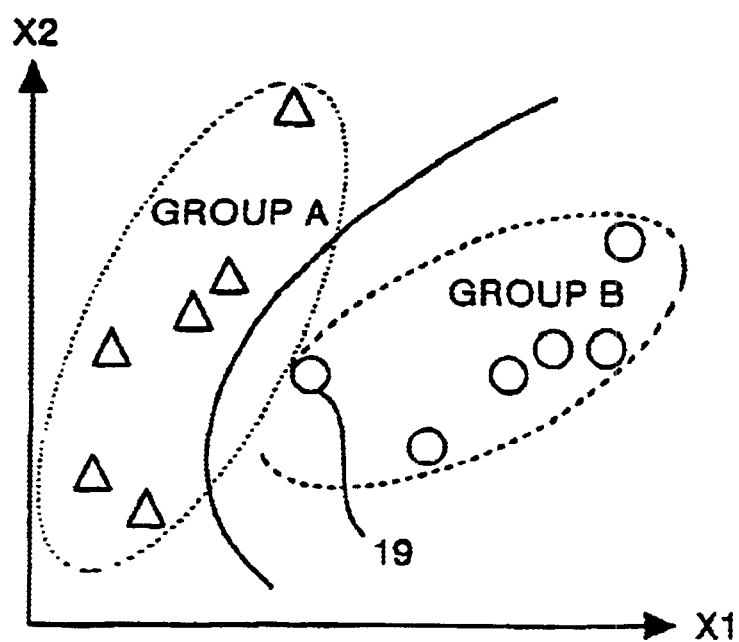

Original data is analyzed by each analyzing tool in accordance with the obtained rule similarly to a conventional case to perform decision making in accordance with, for example, a box and whisker chart (see FIG. 4). Specifically, the yield of a lot group using the device MECA02/03 in STA process and the device MECB02 in STB process is compared with yields of lot groups other than the above lot group. Moreover, a state of MECA02/03, MECB02, or a state of combining them is examined. Thus, by analyzing data through the data mining method and thereby previously quantitatively obtaining the trend, features, and influential degree of the state, it is possible to obtain an effective and high-reliability result.

The reliability information output together with the rule of a regression tree diagram is described below. The reliability information is output as an evaluating-statistical-value list.

According to the list, it is possible to quantitatively evaluate a regression-tree-analysis result. In the case of this embodiment, though not restricted, the average, standard deviation, and the number of data values of purpose variables (that is, yields in many cases) of all sets are output as an evaluating-statistical-value list. FIG. 17 to FIG. 23 show screen displays of regression-tree-analysis results.

In FIG. 17 to FIG. 23, an area 31 for displaying an evaluating-statistical-value list is provided for the lower half portion of a screen 30 and values following "whole ave=", "s=", and "N=" in the display area 31 show the average value, standard deviation, and the number of data values of purpose variables of all sets. The upper half portion of the screen 30 serves as an area 32 for displaying a regression tree diagram.

Moreover, in this embodiment, for example, statistical values for evaluation of ten items though the number of items is not restricted are output in order of the magnitude of ΔS of the above equation (1) when first dividing the data for a regression-tree analysis into two groups as an evaluating statistical-value list. That is, the following are output: S-ratio in the above equation (3), t-value in the above equation (4), difference between average values of purpose variables of divided sets, number of data values of each divided set, attribute names of divided sets (process names in this case), attribute values of two divided sets (device names in this case), and magnitude of purpose variables.

In FIG. 17 to FIG. 23, values following "S-ratio=", "t=", "difference", "N", and "attr=" in the area 31 for displaying an evaluating-statistical-value list show S-ratio, t-value, difference between averages of purpose variables of divided sets, number of data values of each divided set, and attribute names of divided sets. Moreover, notations in parentheses following "group=" in the area 31 for displaying an evaluating-statistical-value list show attribute values of two divided sets and magnitude of purpose variables of the sets.

In this case, S-ratio represents that the reduction rate of evaluation values due to a set division increases as the value of S-ratio decreases and a difference between devices increases. The t-value represents that set division is more clearly performed as the t-value increases and a difference between devices increases. The difference between average values of purpose variables of divided sets represents that the difference between yields of a device used increases as the value of the former difference increases and a difference between devices increases. The number of data values of each of divided sets represents that influences of abnormal data is smaller as two values are close to each other and a difference between devices increases.

The value of ΔS to be evaluated when a regression tree is generated depends on states of each purpose variable and each explanation variable to be analyzed. That is, because the value of ΔS differs whenever individual analyzing engine is executed, a value capable of evaluating a result under each execution in common is necessary to perform accurate evaluation of each execution result. Therefore, in the case of this embodiment, S-ratio and t-value are output as parameters capable of comparing or evaluating results separately executed.

These two parameters make it possible to compare or evaluate results not only under the same execution but also separate execution. Then, it is possible to obtain more information by referencing and analyzing the evaluating-statistical-value list shown in the area 31 for displaying an evaluating-statistical-value list over a plurality of regression tree diagrams.

In the case of this embodiment, a process appearing on a higher hierarchy in a regression tree diagram or a process having a larger value of ΔS and located at a higher rank of an evaluating-statistical-value list has a larger difference between devices in a device-difference analysis. That is, in the case of this embodiment, it is possible to specify not only a regression tree diagram but also a defective process or device in accordance with an evaluating-statistical-value list. Conventionally, however, only processes having the maximum ΔS are output to a normal regression-tree diagram when dividing a set in accordance with ΔS in the equation (1) at the uppermost hierarchy of set division.

Therefore, ΔS is not maximized due to a slight difference, noises, or fluctuation because a process or device not output to a regression tree diagram may be an actual defective process or device. Moreover, when there are a plurality of defect factors, it is impossible to identify them.

Then, how to interpret an evaluating-statistical-value list is described and features of the present invention are further clarified by using a case in which the present inventor applies the present invention to a semiconductor fabrication process and analyzes the process.

Analysis of Each Type of Products

First, a result of analyzing five types of products (MB01 to MB05) having similar design conditions through the same technology is described below. These types of products are processed through almost the same processes.

FIG. 17 to FIG. 21 show results of executing a regression tree analysis for each type of product as ever. FIG. 17 to FIG. 21 show regression tree diagrams of MB01 to MB05 and evaluating-statistical-value lists. In this case, high-order 10 items in an evaluating-statistical-value list are shown in order of "S-ratio; t-value, difference between average values of purpose variables of divided sets, number of data values of each of divided sets, attribute names of divided sets, and attribute values of two divided sets and magnitude of purpose variables of the sets" for each item starting with the highest order. The magnitude is shown by a symbol ">" or "<".

First, in the case of MB01 (refer to FIG. 17), the first includes "0.2508;6.459;30.58286;35 and 9;ST23;ST23M2/ST23M1>ST23M3". The second includes "0.3353;4.542;20.59695;27 and 17;ST35;ST35M2>ST35M4/ST35M3". The third includes "0.3571;4.100;22.29412;34 and 10;ST17;ST17M1>ST17M5". The fourth includes "0.3811;3.619;17.49804;17 and 27;ST10;ST10M4>ST10M3/ST10M2". The fifth includes "0.3837;3.569;17.78299;29 and 15;ST48;ST48M2/ST48M3>ST48M4".

Moreover, the sixth includes "0.3999;3.242;37.53333;42 and 2;ST49;ST49M4/ST49M3>ST49M2". The seventh includes "0.4098;3.041;14.86045;21 and 23;ST21;ST21M4>ST21M3". The eighth includes "0.4173;2.886;24.725;40 and 4;ST18;ST18M2/ST18M3>ST18M1". The ninth includes "0.4190;2.849;14.61786;28 and 16;ST20;ST20M1>ST20M2". The tenth includes "0.4227;2.770;32.97619;42 and 2;ST44;ST44M1>ST44M2/nop". "nop" is artificially supplemented because the data corresponding to the process (ST4 in this case) is lost.

Then, in the case of MB02 (refer to FIG. 18), the first includes "0.3649;3.102;13.07326;17 and 11;ST27;ST27M2/ST27M1<ST27M3". The second includes "0.3840;2.803;12.11497;11 and 17;ST3;ST3M2/ST3M1>ST3M3". The third includes "0.3867;2.760;12.945;20 and 8;ST30;ST30M2/ST30M1<ST30M3". The fourth includes "0.4042;2.483;13.10454;22 and 6;ST31;ST31M1<ST30M3/ST30M2". The fifth includes "0.4262;2.121;15.25467;25 and 3;ST39;ST39M2>ST39M1".

Moreover, the sixth includes "0.4263;2.121;10.1;9 and 19;ST45;ST45M2<ST45M1/ST45M3". The seventh includes "0.4309;2.042;11.92261;23 and 5;ST43;ST43M3/ST43M1>ST43M2". The eighth includes "0.4341;1.987;10.3;7 and 21;ST51;ST51M2<ST51M1". The ninth includes "0.4357;1.958;14.23867;25 and 3;ST8;ST8M4/ST8M2<ST8M3". The tenth includes "0.4359;1.955;23.69259;27 and 1;ST50;ST50M1<ST50M2".

Then, in the case of MB03 (refer to FIG. 19), the first includes "0.2897;3.810;15.58333;18 and 4;ST27;ST27M1/ST27M2>ST27M3". The second includes "0.2897;3.810;15.58333;18 and 4;ST32;ST32M1/ST32M3>ST32M2". The third includes "0.3352;3.136;10.82137;13 and 9;ST42;ST42M2/ST42M3>ST42M1". The fourth includes "0.3498;2.931;10.90571;15 and 7;ST48;ST48M2>ST48M3/ST48M4". The fifth includes "0.3596;2.795;9.863335;10 and 12;ST26;ST26M4>ST26M3".

Moreover, the sixth includes "0.3636;2.739;9.681816;11 and 11;ST18;ST18M2>ST18M3/ST18M1". The seventh includes "0.3673;2.688;13.91403;19 and 3;ST38;ST38M3>ST38M4". The eighth includes "0.3747;2.586;9.644646;14 and 8;ST22;ST22M3/ST22M1<ST22M2". The ninth includes "0.3774;2.549;3.37368;19 and 3;ST8;ST8M2>ST8M3". The tenth includes "0.3814;2.494;9.690475;15 and 7;ST45;ST45M1/ST45M3>ST45M2".

Then, in the case of MB04 (refer to FIG. 20), the first includes "0.3266;3.643;35.00326;23 and 4;ST22;ST22M3/ST22M2/nop>ST22M1". The second includes "0.3380;3.461;45.892;25 and 2;ST13;ST13M2/ST13M1/ST13M3>nop". The third includes "0.3380;3.461;45.892;25 and 2;ST14;ST14M1>nop". The fourth includes "0.3380;3.461;45.892;25 and 2;ST15;ST15M2>nop". The fifth includes "0.3380;3.461;45.892;25 and 2;ST16;ST16M3/ST16M2>nop".

Moreover, the sixth includes "0.3380;3.461;45.892;25 and 2;ST52;ST52M1>nop". The seventh includes "0.3380;3.461;45.892;25 and 2;ST53;ST53M1>nop". The eighth includes "0.3380;3.461;45.892;25 and 2;ST47;ST47M2/ST47M1>ST47M3". The ninth includes "0.3882;2.683;24.01191;21 and 6;ST31;ST31M2>ST31M1". The tenth includes "0.3889;2.672;20.02666;12 and 15;ST46;ST46M2<ST46M3/ST46M1".

Then, in the case of MB05 (refer to FIG. 21), the first includes "0.1403;7.161;37.86496;9 and 13;ST3;ST3M2/ST3M3<ST3M1". The second includes "0.2584;4.324;30.64167;10 and 12;ST7;ST7M4<ST7M5". The third includes "0.2878;3.841;28.59999;11 and 11;ST52;ST52M1<nop". The fourth includes "0.2878;3.841;28.59999;11 and 11;ST53;ST53M1<nop". The fifth includes "0.3418;3.043;24.79833;12 and 10;ST34;ST34M1<ST34M2".

Moreover, the sixth includes "0.3444;3.006;24.90086;13 and 9;ST46;ST46M1/ST46M2<ST46M3". The seventh includes "0.3522;2.897;34.77193;3 and 19;ST33;ST33M3<ST33M2". The eighth includes "0.3555;2.851;23.99829;13 and 9;ST37;ST37M2/ST37M3<ST37M4". The ninth includes "0.3586;2.808;27.85412;17 and 5;ST28;ST28M2>ST2 M8". The tenth includes "0.3709;2.638;22.68205;13 and 9;ST29;ST29M2/ST29M3<ST29M1".

By interpreting each evaluating-statistical-value lists in addition to the regression tree diagrams shown in FIGS. 17 to 21, the following is found out. In the case of MB02, MB03 and MB04, it is regarded that a difference between devices is small mainly judging from the value of t. As a result of analyzing five independent types of products, it is possible to regard ST23M3 as a main abnormal device judging from the result of MB01. Moreover, it is possible to regard ST3M2/ST3M3 as a main abnormal device judging from the result of MB05.

In this case, the same device is used in the processes of ST23 and ST3. That is, ST23M3 and ST3M3 are the same device. Therefore, an abnormal device is identified as a result of the analysis of five independent types of products. Moreover, seven processes are confounded in the case of MB04. Judging from the fact that the device of ST23M3 (ST3M3) is abnormal in the determination including a physical analysis, it is found that a t-value is a very effective evaluation value.

Simultaneous Analysis of All Types of Products (Including ST3 Process)

The result of the analysis performed by merging the data for the above five types of products (MB01 to MB05) is described below. Data mining generally requires a large amount of data. In the case of a device LSI product, however, the quantity of data may be insufficient to perform an analysis every type of product as described above. Therefore, this analysis was executed in order to verify that it is possible to analyze different types of products by handling them as the same types of products.

The data values for every type of products MB01 to MB05 were used as the input data for a regression tree analysis engine by merging them. A purpose variable directly used the yield of each type of product and an explanation variable directly used the device history of each type of product. Because there were six processes having no device history in the case of MB02 compared to other types of products, four types of products MB01 and MB03 to MB05 were excluded. Thus, five different types of products were handled as the same types of products. FIG. 22 shows screen displays of a regression tree diagram obtained by executing a regression tree analysis and an evaluating-statistical-value list. Moreover, the content of an evaluating-statistical-value list is shown in the same format as "Analysis for each type of product".

The first includes "0.4260;4.950;15.83319;70 and 73;ST3;ST3M1/nop>ST3M2/ST3M3". The second includes "0.4286;4.847;21.96218;122 and 21;ST31;ST31M1/ST31M5<ST31M2". The third includes "0.4300;4.791;15.41398;75 and 68;ST48;ST48M2>ST48M4/ST48M3". The fourth includes "0.4508;3.923;14.6089;38 and 105;ST54;ST54M4/nop>ST54M3". The fifth includes "0.4528;3.835;20.63266;128 and 15;ST7;ST7M4<nop/ST7M5".

Moreover, the sixth includes "0.4558;3.696;12.33582;62 and 81;ST33;ST33M2>ST33M3/ST33M1". The seventh includes "0.4666;3.179;15.67419;124 and 19;ST55;ST55M2>ST55M1". The eighth includes "0.4697;3.016;10.13068;73 and 70;ST43;ST43M1/ST43M2>ST43M3". The ninth includes "0.4714;2.927;10.37228;94 and 49;ST17;ST17M1/nop>ST17M5/ST17M4". The tenth includes "0.4716;2.913;12.35196;28 and 115;ST30;ST30M3/ST30M4>ST30M2".

It is found that almost the same difference between devices is present in order of "ST3M1/nop>ST3M2/ST3M3", "ST31M2>ST31M1/ST31M5", and "ST48M2>ST48M3/ST48M4" according to an evaluating-statistical-value list. In these three processes, S-ratio and t-value have almost the same values and there is a significant difference from the fourth value downward. Particularly, t-value ranges between 4.95 and 4.79 which are larger than the t-value of the highest-order branch in independent analysis results of MB02, MB03, and MB04 obtained through "Analysis for each type of product". A branch larger than the t-value (4.95 to 4.79) is only the highest-order branch in independent analysis results of MB01 and MB05 obtained through "Analysis for each type of product".

Therefore, it is clarified from the analysis results that ST23M3, that is, ST3M3 is an abnormal device and a result same as the analysis result for each type of product is obtained. In addition to ST23M3 (ST3M3), devices of ST31M1/ST31M5 and ST48M4/ST48M3 having same difference between devices are listed as prospective objects also judging from the results obtained through "Analysis for each type of product]. The process of ST31 used the same device as the processes of ST17 and ST7. Moreover, the process of ST48 used the same device as the process of ST35. Simultaneous analysis of data for all types of products (excluding ST3 process):

Then, the analysis performed for the data excluding the ST3 process from the data used for the "simultaneous analysis of all types of products (including ST3 process)" is described below. FIG. 23 shows screen displays of a regression tree diagram and an evaluating-statistical-value list obtained by executing a regression tree analysis. Moreover, the content of the evaluating-statistical-value list is shown in accordance with the same format as the case of analysis for each type of product.

The first includes "0.4286;4.847;21.96218;122 and 21;ST31;ST31M1/ST31M5<ST31M2". The second includes "0.4300;4.791;15.41398;75 and 68;ST48;ST48M2>ST48M4/ST48M3". The third includes "0.4508;3.928;14.6089;38 and 105;ST54;ST54M4/nop>ST54M3". The fourth includes "0.4528;3.835;20.63266;128 and 15;ST7;ST7M4<nop/ST7M5". The fifth includes "0.4558;3.696;12.33582;62 and 81;ST33;ST33M2>ST33M3/ST33M1".

Moreover, the sixth includes "0.4666;3.179;15.67419;124 and 19;ST55;ST55M2>ST55M1". The seventh includes "0.4697;3.016;10.13068;73 and 70;ST43;ST43M1/ST43M2>ST43M3". The eighth includes "0.4714;2.927;10.37228;94 and 49;ST17;ST17M1/nop>ST17M5/ST17M4". The ninth includes "0.4716;2.913;12.35196;28 and 115;ST30;ST30M3/ST30M4>ST30M2". The tenth includes "0.4717;2.906;10.08816;89 and 54;ST61;ST61M1>ST61M2".

As a result of the analysis excluding ST3 process having the maximum difference between devices in "Simultaneous analysis of all types of products (including ST3 process)" in accordance with an evaluating-statistical-value list, it is found from an evaluating-statistical-value list that the yield is lowered because of using the device of ST31M1/ST31M5. Moreover, ST48process using ST48M* (symbol * denotes a numeral showing the number of a device) is confounded with ST3 process and ST31 process because the ST48 process does not appear on a regression tree diagram through "Simultaneous analysis of all types of products (including ST3 process)" and "Simultaneous analysis of all types of products (excluding ST3 process)".

Moreover, it is possible to regard ST3 process and ST31 process to be independent from each other because the both processes are located at high ranks of the regression tree diagram and evaluating-statistical-value list. Thus, by analyzing a regression tree diagram and an evaluating-statistical-value list, the information for independent characteristic and confounding characteristic of different between devices is obtained. The independent characteristic of ST3 process and ST31 process is consistent also from the viewpoint of processing contents. Moreover, the confounding characteristic of ST48 process is worthy of the examination for identifying which a true factor is. Analysis covering a plurality of different types of item groups:

Then, a case is described below in which each record of original data has an explanation variable comprising a plurality of items included in a plurality of different types of item groups. FIG. 24 is a schematic view showing a data format used for inputs of a regression tree analysis. Each record of the original data is shown every wafer number unit. Each record is constituted by using the name of a device used in each fabrication process (process A or B) and the value of each electrical characteristic data (RSP, WET_i) as explanation variables and the yield of wafers as a purpose variable. That is, in the case of the example shown in FIG. 24, it is assumed that a difference between devices and electrical-characteristic data are effective for a yield. In this case, items of a device used and items of electrical-characteristic data are included in different types of item groups.

Figure 25:
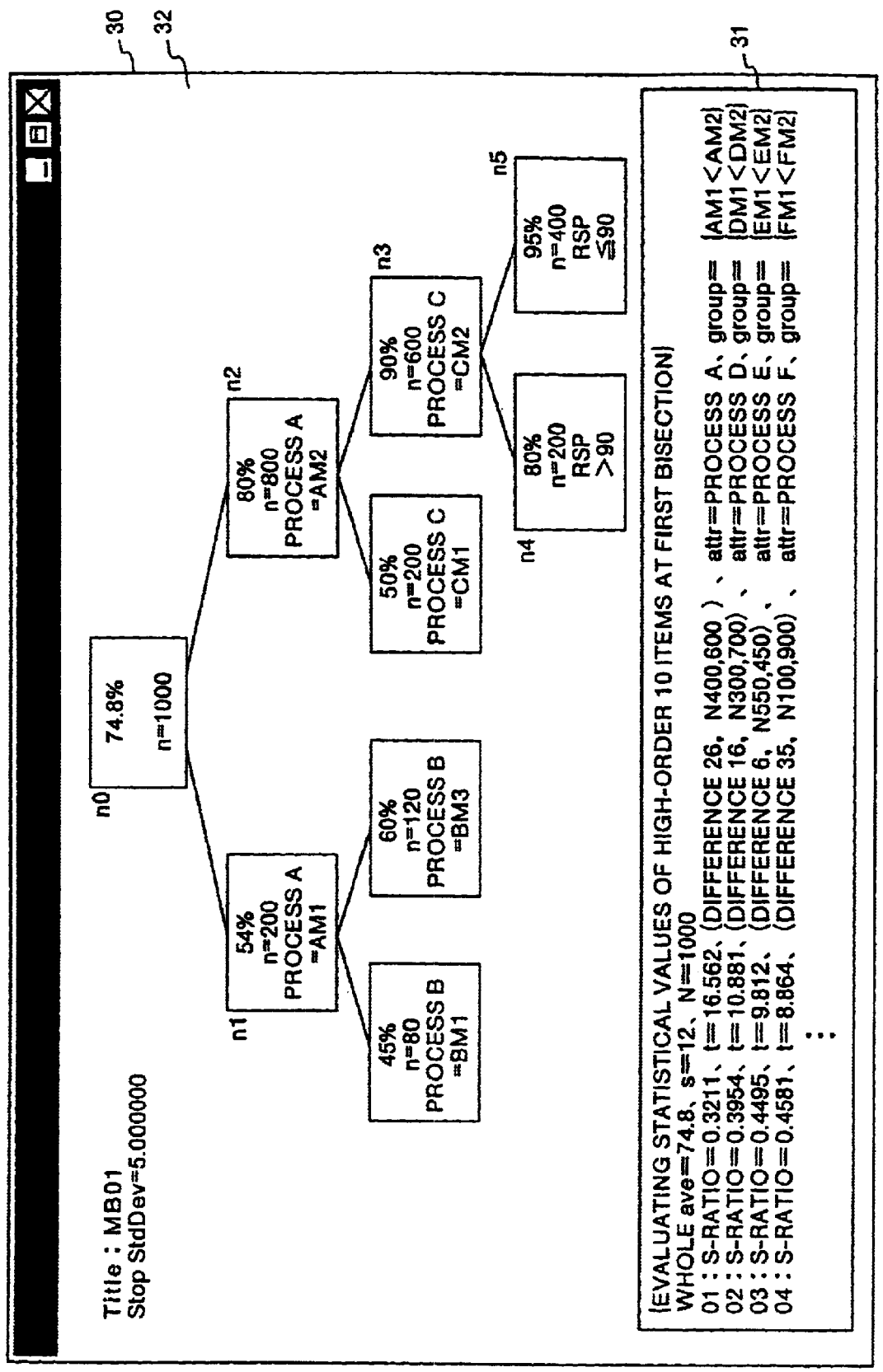
FIG. 25 is a screen display showing a result of applying a regression tree analysis to a plurality of different types of item groups in the embodiment.

A case of analyzing the original data shown in FIG. 24 is described below. FIG. 25 is a screen display showing results of executing a regression tree analysis of the original data shown in FIG. 24 and FIG. 26 is a table simultaneously showing results of the regression tree analysis shown in FIG. 25. In FIG. 25, n0 to n5 are node numbers for explanation but they are not displayed on a screen (the same is true for FIG. 29).

As seen from FIG. 25, the average yield of all wafers, that is, 1,000 wafers is 74.8% (node n0). Device AM1 is used for 200 wafers out of 1,000 wafers in process A and their average yield is 54% (node n1). Device AM2 is used for 800 remaining wafers out of all wafers in process A and their average yield is 80% (node n2). 200 wafers of node n1 are divided into 80 wafers (average yield of 45%) using the device BM1 and 120 wafers (average yield of 60%) using the device BM3 in process B.

The device CM2 is used for 600 wafers out of 800 wafers of node n2 in process C and the average yield of 600 wafers is 90% (node n3). The average yield of 200 wafers out of 800 wafers of node n2 using the device CM1 in the process C is 50%. The value of electrical-characteristic data RSP of 200 wafers out of 600 wafers of node n3 is larger than 90 and the average yield of 200 wafers is 80% (node n4). However, the value of the electrical characteristic data RSP of 400 remaining wafers of node n3 is 90 or less and the average yield of 400 wafers is 95% (node n5).

The following are known from FIGS. 25 and 26. That is, which to use the device AM1 or AM2 in the process A most influences the yield and the yield is improved by using the device AM2. Among wafers using the device AM2 in the process A, the yield of those using the device CM2 instead of the device CM1 in the process C is improved compared to the yield of those using the device AM2 in the process A. Moreover, the state of the electrical-characteristic data RSP most influences the yield of a wafer group using the device CM2 in the process C as well as using the device AM2 in process A. In the process A, however, a device used in the process B secondly most influences the yield of wafers using the device AM1 in the process A.

Therefore, in the case of the regression tree diagram of the example shown in FIG. 25, high-order two hierarchies are due to a difference between devices. In the case of the regression tree diagram, an explanation variable appearing in a higher hierarchy has a larger influence on a purpose variable. Therefore, in the case of this example, a difference between devices greatly influences a yield in the analysis using all wafers even if including a composite condition but electrical-characteristic data may not be very effective. In the case of a wafer group using the device AM2 in the process A and the device CM2 in the process C, the electrical-characteristic data RSP is most effective for the yield. Thus, the average yield of all wafers is 74.8%. However, by dividing wafers into several sets in relation to a device used or electrical-characteristic data, it is found that the above-described features and regularity are present. A regression tree analysis automatically extracts those features and regularity and provides a clue of a yield analysis.

Figure 27A:
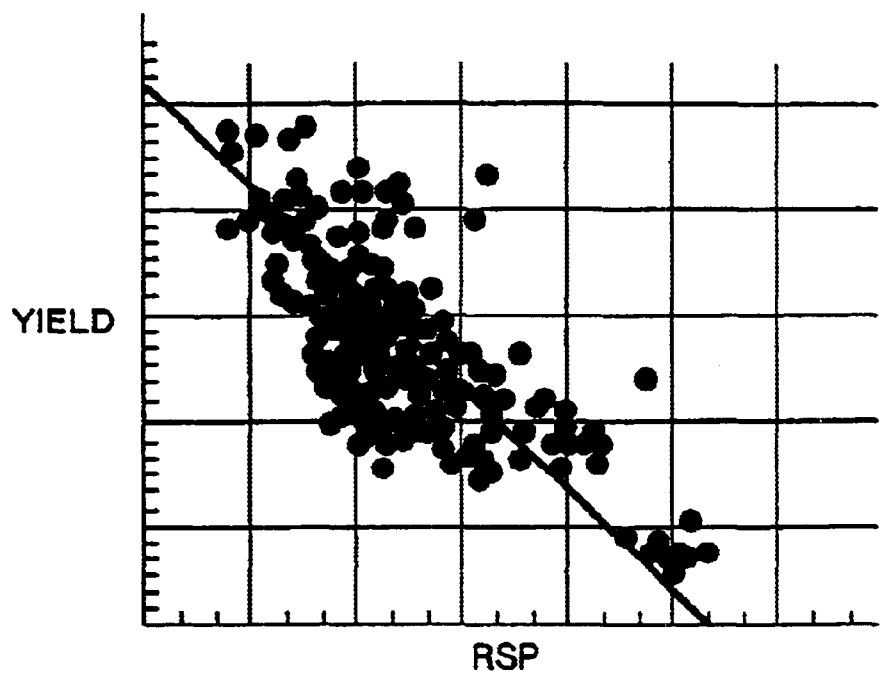
FIG. 27A and FIG. 27B are characteristic diagrams showing correlations between electrical-characteristic data RSP and yield of the original data shown in FIG. 24 when reducing and not reducing influences of a difference between devices.
Figure 27B:
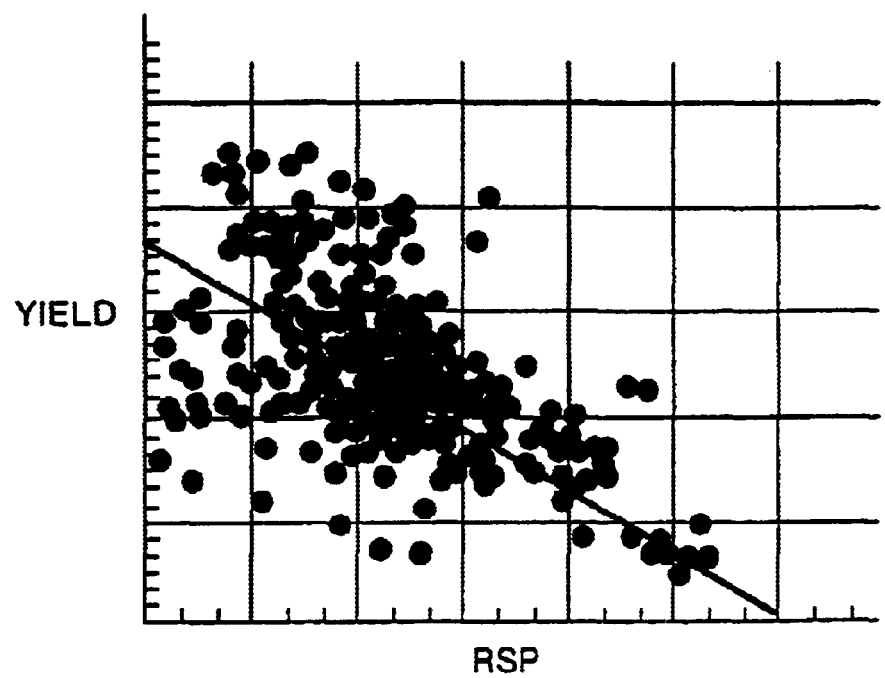

FIG. 27A and FIG. 27B are characteristic diagrams showing correlations between electrical-characteristic data RSP and yield for the original data shown in FIG. 24. FIG. 27A is a correlation diagram about 600 wafers of the node n3 in FIG. 25. FIG. 27B is a correlation diagram about 1,000 wafers of the node n0 in FIG. 25. In the case of the correlation diagram shown in FIG. 27A, influences of the difference between devices of the processes A and C having larger influence than that of the electrical-characteristic data RSP on a yield is eliminated. In the case of the correlation diagram shown in FIG. 27B, however, because influences of the difference between devices of the processes A and C is included, noises are increased compared to the case of the correlation diagram shown in FIG. 27A.

Therefore, by selecting and analyzing 600 wafers of the node n3 in accordance with the regression tree diagram shown in FIG. 25, it is possible to know more accurately the influences of the electrical-characteristic data RSP on a yield. Thus, a regression tree analysis automatically extracts data for a device-using condition to be analyzed when obtaining the correlation between yield and electrical-characteristic data RSP. For example, by outputting a record classification number (record id) included in each node as one piece of output information of a regression tree analysis and making a convention analyzing tool read the information for the extracted classification number, it is possible to obtain more accurate analysis results of the yield of electrical-characteristic data RSP every device-using condition.

Moreover, it is possible to evaluate the degree of influences of each explanation variable on a purpose variable and the reliability of the influence with quantitative values while covering item groups serving as factors in accordance with the above S-ratio, t-value, difference between average values of purpose variables of divided sets, and number of data values of each divided set. That is, by using only the data shown in FIG. 27(a) and thereby, performing a regression tree analysis, and evaluating the above S-ratio, t-value, differences, and number of data values, it is possible to quantitatively obtain influences of different item groups such as a difference between devices and electric-characteristic data on yields without obtaining new data.

Figure 28A:
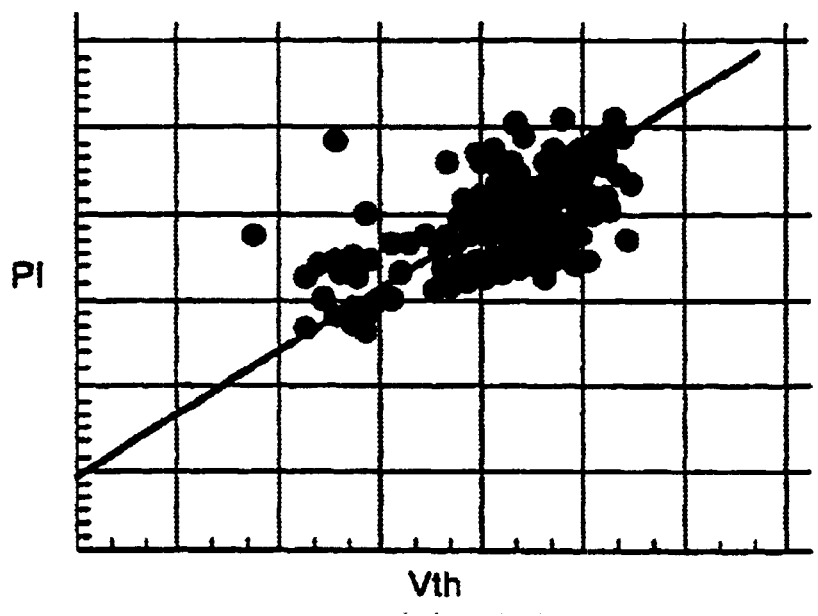
FIG. 28A and FIG. 28B are characteristic diagrams showing I–V characteristics of a transistor when reducing and not reducing influences of noises.
Figure 28B:
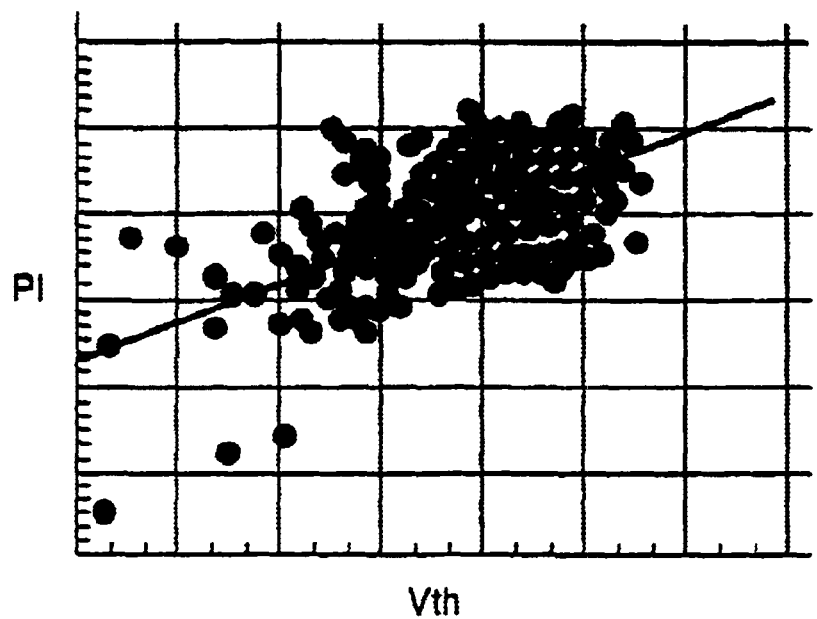

Though an illustration and detailed description are omitted, it is possible to obtain an accurate analysis result of an I-V characteristic which is an important characteristic controlling transistor characteristics by reducing noises and performing an analysis similarly to the case of obtaining the correlation between yield and electrical-characteristic data RSP. FIG. 28A shows an analysis result eliminating influences of noises and FIG. 28B shows an analysis result including influences of noises. It is possible to automatically obtain the correlation diagram shown in FIG. 27A and FIG. 28A within several minutes in accordance with a yield analysis using the data analyzing device shown in FIG. 8.

Moreover, the regression tree diagram and evaluating-statistical-value list in FIG. 25 show the relation for yields about both a difference between devices and electrical-characteristic data and show that influences of electrical-characteristic data is smaller than that of a difference between devices. Therefore, to more accurately obtain influences of a difference between devices on a yield, it is also allowed to apply a regression tree analysis only to 800 wafers excluding wafers (200) included in the node n4 in the regression tree diagram in FIG. 25, for example. FIG. 29 shows results of the above regression-tree analysis.

Thus, it is possible to perform an analysis by removing a factor most influencing on a yield from electrical-characteristic-data factors. Therefore, it is possible to more accurately obtain a difference between devices. As a result, even if node branch states in a regression tree diagram are changed or the regression tree diagram is not greatly changed, the sequence maybe reversed like the processes D and E when the significant difference between values in an evaluating-statistical-value list is small (refer to FIG. 25 and FIG. 29). Instead of excluding 200 wafers included in the node n4, it is also allowed to exclude wafers having an electrical-characteristic data RSP larger than 90, that is, meeting RSP>90.

FIG. 30 is a screen display showing another example of the result of applying an regression tree analysis to the data assuming that AM3 is also used in the process A in original data. In FIG. 30, n10 to n15 represent node numbers for explanation but they are not displayed on a screen. FIG. 30 is described below. The average yield of 1,000 wafers is 74.8% (node n10). Among these 1,000 wafers, the average yield of 800 wafers using either of the devices AM2 and AM3 in the process A is 80% (node n12).

The average yield of 600 wafers using the device CM2 in the process C among 800 wafers of the node n12 is 90% (node n13). In the case of 400 wafers out of 600 wafers of the node n13, the value of electrical-characteristic data RSP is 90 or less and the average yield of 400 wafers is 95% (node n15). Moreover, 400 wafers of the node n15 are divided into 150 wafers (average yield of 90%) using the device AM2 in the process A and 250 wafers (average yield of 98%) using the device AM3 in the process A.

In the case of the example shown in FIG. 30, even if selecting 600 wafers of the node n13 and obtaining the correlation between electrical-characteristic data RSP and yield of only 600 wafers, it is impossible to completely eliminate influences of a difference between devices because a branch due to the difference between devices of the process A appears below the node n15. However, even in this case, it is possible to decrease influences of the difference between devices. Therefore, it is possible to perform an accurate analysis compared to the case of analyzing 1,000 wafers of the node n10, that is, analyzing the wafers without eliminating influences of a difference between devices at all.

According to the above-explained embodiment, an evaluating-statistical-value list is output together with a regression tree diagram as regression-tree-analysis results. Therefore, it is possible to evaluate the accuracy and reliability of a rule extracted through a regression tree analysis in accordance with the evaluating-statistical-value list.

Moreover, it can be said that the evaluating-statistical-value list serves as an comprehensible criterion for making an end user unfamiliar with a statistical method understand an analysis result conforming to data mining.

Moreover, it is possible to identify a significant difference common to a plurality of types of products by merging and simultaneously analyzing the data values for a plurality of types of products. Thereby, it is possible to obtain the information for the independent characteristic or confounding of abnormal processes whose classification has been difficult so far by the analysis for each type of product.

Furthermore, it is possible to perform an analysis by simultaneously handling a plurality of items included in different item groups as explanation variables, using regression tree analysis results, analyzing a set included or not included in a watched node, and thereby eliminating or decreasing influences of items other than the watched item, that is, noises. Therefore, it is possible to obtain more accurate analysis results and thereby evaluate that improvement measures for which item are effective in accordance with the analysis results.

Moreover, it is possible to easily clarify the correlation between yield and electrical-characteristic data whose classification has been difficult so far. Moreover, because this analyzing method makes it possible to reduce or separate influences of various factors for a yield, it is very effective not only for a mass-production stage but also for a development stage in which various factors are more complexly confounded each other.

In the above-explained embodiment, a case is described in which a yield is analyzed by using process data for a semiconductor fabrication process. However, the present invention can be applied not only to a yield analysis but also to a classification analysis of various data values. Moreover, though the above-explained embodiment uses the data mining method as a statistical method for extracting a rule, it is possible to apply the present invention also to other significant-difference determining methods. Furthermore, values of evaluating-statistical-value lists used for the above embodiment and regression tree diagrams shown in FIG. 15 to FIG. 23, FIG. 25, FIG. 29, and FIG. 30 are shown as examples, therefore the present invention is not restricted to them.

Moreover, in above-explained embodiment, a case is described in which influences of a difference between devices on a yield is larger than that of electrical-characteristic data on the yield. However, when influences of the latter is larger than that of the former, it is also possible to obtain influences of fluctuation of electrical-characteristic data, that is, an analysis result of a difference between devices when noises are reduced. In this case, the highest hierarchy is branched by electrical-characteristic data in a regression tree diagram and a branch due to a difference between devices appears at a layer lower than the highest hierarchy.

Furthermore, in the above-explained embodiment, a case is described in which two item groups of a difference between devices and electrical-characteristic data influence a yield. However, the present invention is not restricted to the above case. The present invention can be also applied to a case in which a difference between devices, electrical-characteristic data, and other tree types of item groups or four types of item groups or more influence a yield.

Furthermore, the data analyzing method described in the above-explained embodiment can be realized by executing prepared programs with a computer such as a personal computer or workstation. These programs are stored in a computer-readable recording medium such as a hard disk, floppy disk, CD-ROM, MO, or DVD and then read out of the recording medium by a computer and executed. These programs can be distributed through the above recording medium or a network as transmission media.

According to the present invention, because a rule present between a plurality of original data values in an original data group is extracted and the extracted rule is output together with the information showing the reliability of the rule, it is possible to evaluate the accuracy of the extracted rule and obtain effective factors from a secondary factor downward together with quantitative evaluation values of the factors. Therefore, it is possible to evaluate the accuracy or reliability of a data analysis result through data mining or the like and improve the efficiency and reliability of a data analysis widely used in industrial fields. When applying the present invention to the yield analysis of a fabrication process, great advantage is brought to improvement of productivity. Moreover, according to the present invention, it is possible to confirm the degree of a significant difference, classification of a plurality of factors, and relation between explanation variables. Therefore, an advantage is also obtained that it is possible to quantitatively confirm the effect of measures decided in accordance with an analysis result.

Moreover, according to the present invention, it is possible to perform an analysis under a state of less noises by simultaneously handling a plurality of items included in different item groups as explanation variables and using regression-tree-analysis results and thereby analyzing a set included or not included in a watched node. Therefore, it is possible to obtain a more accurate analysis result of a watched item.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data analyzing device comprising:
   an original data group constituted of a plurality of original data values;
   a data processing section for extracting a rule present between the original data values and generating a reliability-information-provided rule file to which the information showing the reliability of the rule is added; and
   an analyzing tool for analyzing the original data values in accordance with the rule file.

2. The data analyzing device according to claim 1, wherein
   said data processing section clarifies the causality between and the influential degree of record items of the original data group and extracting a rule including hidden information or regularity through a statistical method.

3. The data analyzing device according to claim 1, wherein
   said data processing section extracts a rule including a guideline for items to be analyzed by the analyzing tool or combinations of the items in accordance with a data mining technique.

4. The data analyzing device according to claim 1, wherein
   said data processing section obtains a set-division evaluation value showing the clearness of division when dividing a set constituted of a plurality of original data values into two subsets as the information showing the reliability of the rule.

5. The data analyzing device according to claim 4, wherein
the original data includes purpose variables purposing the search of fluctuation causes or fluctuation patterns, and
the set-division evaluation value is a value S-ratio obtained as, $$S\text{-ratio } ((S1+S2)/2)S0,$$

wherein, S0 denotes the sum of squares of purpose variables before a set constituted of a plurality of data values is divided into two subsets and S1 and S2 respectively denote the sum of squares of purpose variables of subsets after divided.

6. The data analyzing device according to claim 4, wherein
the original data includes purpose variables purposing the search of fluctuation causes or fluctuation patterns, and
the set-division evaluation value has a value t obtained as, $$t = \frac{|\overline{X1} - \overline{X2}|}{\sqrt{\frac{S1+S2}{N1+N2-2} \times \left(\frac{1}{N1} + \frac{1}{N2}\right)}}$$

or $$t = \frac{|\overline{X1} - \overline{X2}|}{\sqrt{\frac{S1}{N1^2} + \frac{S2}{N2'}}},$$

wherein, S1 and S2 respectively denote the sum of squares of purpose variables of sets obtained by dividing a set constituted of a plurality of original data values into two subsets, N1 and N2 respectively denote the number of factors of each subset after divided, and $\overline{X1}$ and $\overline{X2}$ respectively denote the average of subsets after divided.

7. The data analyzing device according to claim 1, wherein
said data processing section obtains the information including factors or conditions from a secondary factor or condition downward as the information showing the reliability of the rule.

8. The data analyzing device according to claim 1 further comprising:
a front data processing section for extracting a combination of optional data species or optional data items from the original data group.

9. A data analyzing device according to claim 1 which analyzes a yield-deterioration factor in a fabrication process,
wherein the original data includes purpose variables purposing the search of fluctuation causes or fluctuation patterns and explanation variables for explaining the fluctuation of the purpose variables,
the purpose variables are fabrication yields and the explanation variables are variables including the history of a device used, test results, design information, and measured data.

10. A data analyzing method comprising the steps of:
extracting a rule present between a plurality of original data values, generating a reliability-information-provided rule file to which the information showing the reliability of the rule is added, and outputting the information showing the reliability together with the rule; and
analyzing the original data values in accordance with the rule file.

11. The data analyzing method according to claim 10, wherein the causality between or influential degree of items of each record in the original data values is clarified and a rule including hidden information or regularity is extracted in accordance with a statistical method.

12. The data analyzing method according to claim 10, wherein a rule including an index for items to be analyzed or a combination of them when analyzing the original data is extracted in accordance with a data mining technique.

13. The data analyzing method according to claim 10, wherein information showing the reliability of the rule is a set-division evaluation value showing the clearness of division when dividing a set constituted of a plurality of original data values into two subsets.

14. The data analyzing method according to claim 13, wherein
the original data includes purpose variables purposing the search of fluctuation causes or fluctuation patterns, and
the set-division evaluation value is a value of S-ratio obtained as, $$S\text{-ratio} = ((S1+S2)/2)/S0,$$

wherein, S0 denotes the sum of squares of purpose variables before dividing a set constituted of a plurality of original data values into two subsets and S1 and S2 respectively denote the sum of squares of purpose variables of each subset after divided.

15. The data analyzing method according to claim 13, wherein
the original data includes purpose variables purposing the search of fluctuation causes or fluctuation patterns, and
the set-division evaluation value is a value t obtained by, $$t = \frac{|\overline{X1} - \overline{X2}|}{\sqrt{\frac{S1+S2}{N1+N2-2} \times \left(\frac{1}{N1} + \frac{1}{N2}\right)}}$$

or $$t = \frac{|\overline{X1} - \overline{X2}|}{\sqrt{\frac{S1}{N1^2} + \frac{S2}{N2'}}},$$

wherein, S1 and S2 respectively denote the sum of squares of purpose variables of sets obtained by dividing a set constituted of a plurality of original data values into two subsets, N1 and N2 respectively denote the number of factors of each subset after divided, and $\overline{X1}$ and $\overline{X2}$ respectively denote the average of subsets after divided.

16. The data analyzing method according to claim 10, wherein
information showing the reliability of the rule includes factors or conditions from a secondary factor or condition downward.

17. The data analyzing method according to claim 10, wherein a combination of optional data species or optional data items is previously extracted from the original data values as the data to be processed to extract a rule.

18. The data analyzing method according to claim 10, wherein to analyze yield deterioration factors in a fabrication process, the original data includes purpose variables purposing the search of fluctuation causes or fluctuation patterns and explanation variables for explaining the fluctuation of the purpose variables, the purpose variables are fabrication yields and the explanation variables are variables including the history of a device used, test results, design information, and measured data.

19. The data analyzing method according to claim 10, wherein each record in the original data has a plurality of item included in a plurality of different types of item groups as purpose variables purposing the search of fluctuation causes or fluctuation patterns, and explanation variables for explaining the fluctuation of the purpose variables; and analyzes a set included in or not included in a watched node in a regression tree diagram based on the extracted rule.

20. The data analyzing method according to claim 10, wherein each record in the original data has purpose variables purposing the search of fluctuation causes or fluctuation patterns and a plurality of items included in a plurality of different types of item groups as explanation variables for explaining the fluctuation of the purpose variables and analyzes a set included or not included in a watched node in a regression tree diagram according the extracted rule.

21. A computer readable medium for storing instructions, which when executed by a computer, causes the computer to perform the steps of:

extracting a rule present between a plurality of original data values, generating a reliability-information-provided rule file to which the information showing the reliability of the rule is added, and outputting the information showing the reliability together with the rule; and analyzing the original data values in accordance with the rule file.

* * * * *

UNITED STATES PATENT AND TRADEMARK OFFICE
CERTIFICATE OF CORRECTION

PATENT NO. : 6,629,090 B2
DATED : September 30, 2003
INVENTOR(S) : Hidetaka Tsuda et al.

It is certified that error appears in the above-identified patent and that said Letters Patent is hereby corrected as shown below:

Column 21,
Lines 30-34, change the equation to:

$$t = \frac{\left|\overline{X1} - \overline{X2}\right|}{\sqrt{\dfrac{S1}{N1^2} + \dfrac{S2}{N2^2}}}$$

Column 22,
Lines 45-49, change the equation to:

$$t = \frac{\left|\overline{X1} - \overline{X2}\right|}{\sqrt{\dfrac{S1}{N1^2} + \dfrac{S2}{N2^2}}}$$

Signed and Sealed this

Seventeenth Day of February, 2004

JON W. DUDAS
*Acting Director of the United States Patent and Trademark Office*